US009329329B2

(12) United States Patent
Ide et al.

(10) Patent No.: US 9,329,329 B2
(45) Date of Patent: *May 3, 2016

(54) INFORMATION PROCESSING APPARATUS, CALCULATION METHOD, PROGRAM, AND STORAGE MEDIUM

(75) Inventors: Tsuyoshi Ide, Kanagawa-ken (JP); Takashi Imamichi, Kanagawa-ken (JP); Hidetoshi Numata, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1049 days.

This patent is subject to a terminal disclaimer.

(21) Appl. No.: 13/441,981

(22) Filed: Apr. 9, 2012

(65) Prior Publication Data

US 2012/0262507 A1    Oct. 18, 2012

(30) Foreign Application Priority Data

Apr. 12, 2011    (JP) .................................. 2011-088093

(51) Int. Cl.
| F21V 8/00 | (2006.01) |
| G06T 11/00 | (2006.01) |
| G02F 1/1335 | (2006.01) |

(52) U.S. Cl.
CPC .............. *G02B 6/0065* (2013.01); *G06T 11/00* (2013.01); *G02B 6/004* (2013.01); *G02B 6/0043* (2013.01); *G02B 6/0061* (2013.01); *G02F 1/133606* (2013.01)

(58) Field of Classification Search
CPC .... G02B 6/004; G02B 6/0041; G02B 6/0043; G02B 6/0045; G02B 6/58; G02B 6/0061; G02B 6/0065; G02B 6/0058; G02F 1/133611
USPC ..................................................... 345/30, 75
See application file for complete search history.

(56) References Cited

U.S. PATENT DOCUMENTS

| 2003/0098834 A1* | 5/2003 | Ide et al. ........................ 345/87 |
| 2003/0210210 A1* | 11/2003 | Ide et al. ........................ 345/30 |
| 2010/0321455 A1* | 12/2010 | Lee et al. ...................... 347/110 |

FOREIGN PATENT DOCUMENTS

| JP | 6-318249 | 11/1994 |
| JP | 8-227456 | 9/1996 |

(Continued)

OTHER PUBLICATIONS

T. Imamichi, et al., "A multi-sphere scheme for 2D and 3D packing problems," In SLS 2007: Proceedings of Engineering . . . V. 4638 of Lecture Notes in CS, 207-211, Springer, 2007.

(Continued)

*Primary Examiner* — Kent Chang
*Assistant Examiner* — Herbert L Hagemeier
(74) *Attorney, Agent, or Firm* — Scully, Scott, Murphy & Presser, P.C.; Jennifer Davis, Esq.

(57) ABSTRACT

An information processing apparatus, a calculation method, a program, and a storage medium for generating a uniformly distributed discrete pattern. To calculate a spatial arrangement of a plurality of elements of a discrete pattern, the plurality of elements being arranged in a spatially discrete manner, an information processing apparatus according to the present invention determines, for each of the elements, a density in an initial position given to the element from a density distribution of the elements in a region where the elements are arranged in the discrete pattern and places, for the initial position of each of the elements, a figure having a size corresponding to the density and representing a region where the element repels other elements and a movement range of the figure. The information processing apparatus minimizes an objective function, computes an optimal solution, and outputs the optimal solutions.

16 Claims, 14 Drawing Sheets

(56) References Cited

FOREIGN PATENT DOCUMENTS

| | | |
|---|---|---|
| JP | 10-153779 | 6/1998 |
| JP | 2006-18404 | 1/2003 |
| JP | 2000-59626 | 2/2003 |
| JP | 2003-66208 | 3/2003 |
| JP | 2004-199271 | 7/2004 |
| JP | 2006-310988 | 11/2006 |
| JP | 2007-17380 | 1/2007 |
| JP | 2007-306576 | 11/2007 |

OTHER PUBLICATIONS

T. Imamichi, et al., "Performance Analysis of a Collision Detection Algorithm of Spheres . . . ," IEICE Transactions on Fundamental . . . V. E91-A, Issue 9, 2308-2313, Sep. 2008.

Imamichi, "Nonlinear Programming Based Algorithms to Cuffing and Packing Problems," 2009.

Office Action dated May 1, 2015, received in a related U.S. Appl. No. 13/591,409.

* cited by examiner

FIG. 3
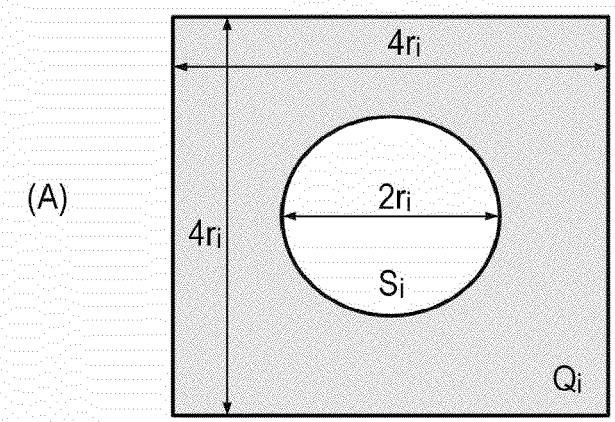
(A)
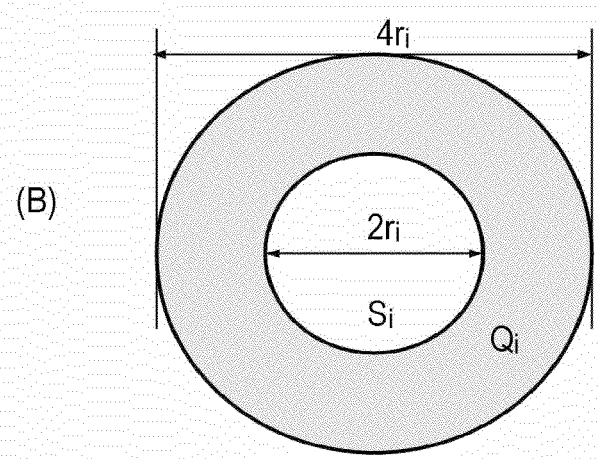
(B)

FIG. 8
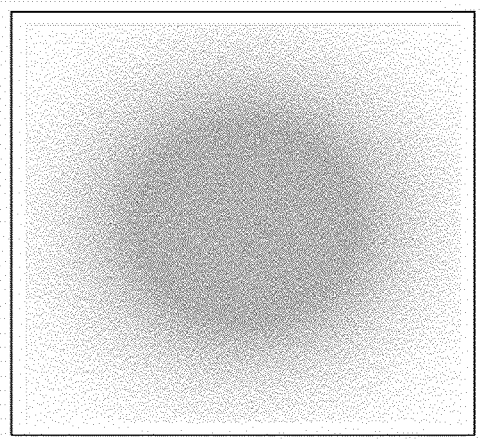
(A)
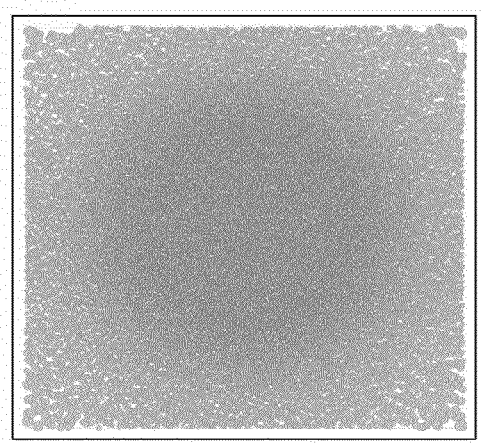
(B)
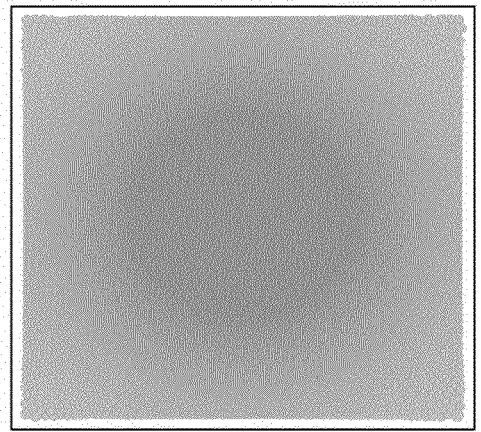
(C)
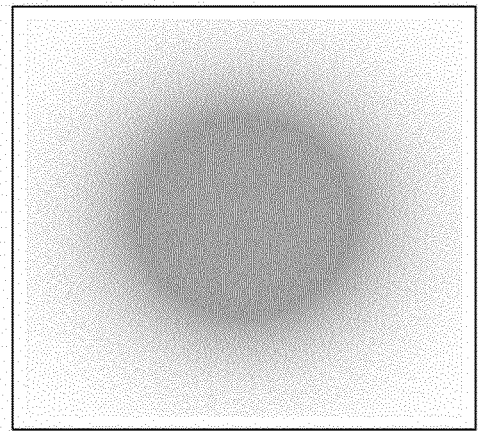
(D)

FIG. 11
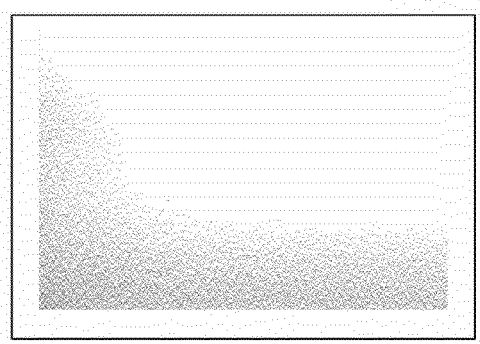
(A)
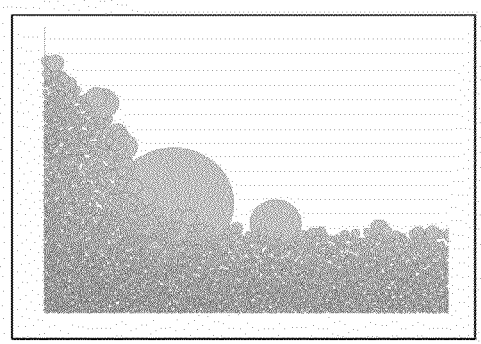
(B)
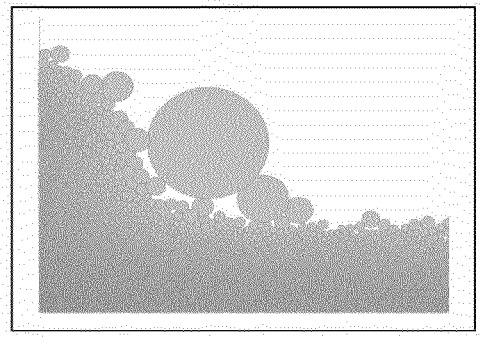
(C)
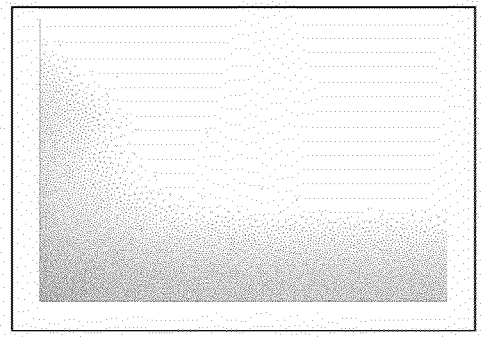
(D)

FIG. 12
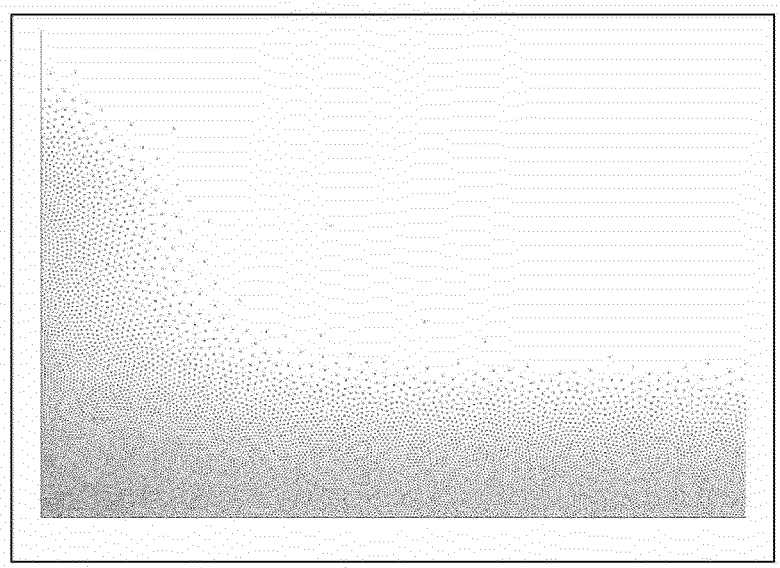
(A)
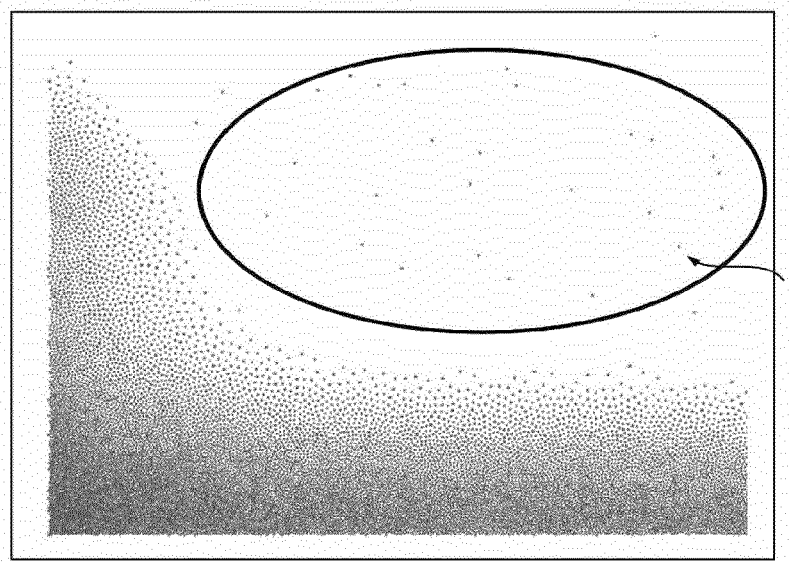
(B)
E

FIG. 14
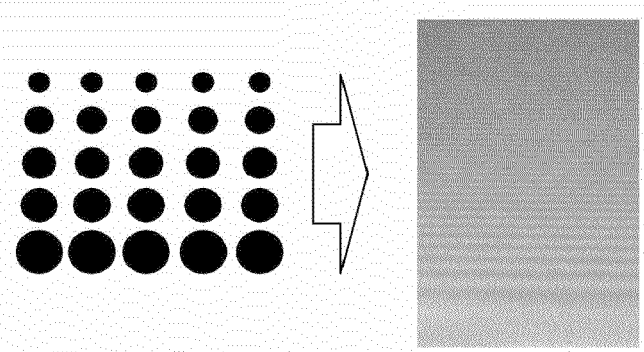
(A)
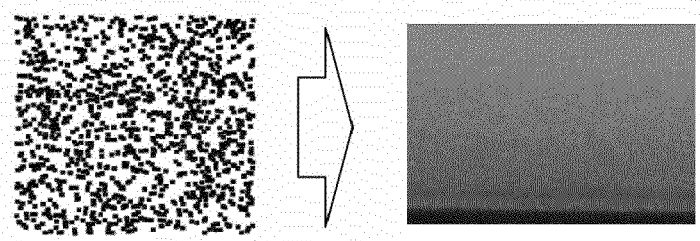
(B)

INFORMATION PROCESSING APPARATUS, CALCULATION METHOD, PROGRAM, AND STORAGE MEDIUM

CROSS REFERENCE TO RELATED APPLICATION

This application claims priority under 35 U.S.C. 119 from Japanese Application 2011-088093, filed Apr. 12, 2011, the entire contents of which are incorporated herein by reference.

BACKGROUND OF THE INVENTION

1. Field of the Invention

The present invention relates to processing for generating a discrete pattern, and more specifically, to an information processing apparatus, a calculation method, a program, and a storage medium for generating a uniformly distributed discrete pattern.

2. Description of the Related Art

A backlight unit for use in a liquid crystal display (LCD) employs a scatter dot pattern made of minute scatterers whose filling factors continuously vary on the lower surface of a light guide plate to reduce optical interference with a member including a regular pattern, such as a prism sheet or a liquid crystal cell, and to make luminance distribution uniform. In addition, to complement the advantageous effects of the dot pattern, a diffuser sheet having a scatter dot pattern disposed between the upper surface of the light guide plate and the prism sheet is also used. The scatter dot pattern has significant effect on the optical quality of the backlight from the viewpoint of the structure. To improve light utilization efficiency of a device, such as the backlight for use in the LCD, it is desirable to optimize the above scatter dot pattern.

In light of the fact that an ordered lattice produces strong moiré fringes caused by optical interference between the dot pattern and the liquid crystal cell (FIG. 14(A)), there is a known technique for reducing moiré by displacing a lattice point of the ordered lattice provided as the initial arrangement using pseudorandom numbers or by providing a dot position with pseudorandom numbers. However, if dots overlap each other, the overlapping part is visually recognized as a bright spot or a dark spot; if the distribution of the dot pattern is non-uniform, it is perceived as luminance non-uniformity (FIG. 14(B)).

Examples of a technique that aims to obtain a uniform dot pattern are described in Japanese Unexamined Patent Application Publication No. 2007-306576 (Patent Literature 1) and No. 2003-66208 (Patent Literature 2). Patent Literature 1 and Patent Literature 2 disclose a technique for making a dot pattern uniform by providing an initial arrangement of dots using a low discrepancy sequence and then solving the equation of motion in which a repulsive force is made to act between the dots. There is also a technique for optimizing the pattern by seeing a set of dots as a particle system in which a repulsive force interacts (Japanese Unexamined Patent Application Publication No. 2007-17380 (Patent Literature 3) and No. 2004-199271 (Patent Literature 4)) and solving its many-body problem. Japanese Unexamined Patent Application Publication No. 10-153779 (Patent Literature 5) discloses a technique for making a dot pattern random using random numbers such that a predetermined condition for a radial distribution function is satisfied.

The above-described issue, which aims to make distributed dots irregular and uniform, is also seen in the field of image processing. For example, Japanese Unexamined Patent Application Publication No. 2003-18404 (Patent Literature 6) and No. 2000-59626 (Patent Literature 7) disclose a technique for generating a threshold matrix using a dot pattern formed by applying a repulsive force potential in which the shape is adjusted so as to facilitate formation of a periodical dot pattern in a local region to each dot with the aim of enhancing regularity of the dot pattern in the local region and improving the uniformity and virtual image issue. In relation to other dot patterns, a dot pattern smoothing method for performing complementary processing on dots above, below, to the left, and to the right of a dot to be processed according to the rule is disclosed in Japanese Unexamined Patent Application Publication No. 8-227456 (Patent Literature 8), and a process for calculating the length of a space between dots is disclosed in Japanese Unexamined Patent Application Publication No. 2006-310988 (Patent Literature 9). As a method for optimizing an image pattern, a dithering optimization technique for generating an improved matrix by swapping values in a dither matrix, forming an objective function, and optimizing that objective function with the aim of providing an improved dithering optimization method for displaying an image on a discrete level output display by the use of a process for efficiently assigning an intensity value element in the dither matrix is disclosed in Japanese Unexamined Patent Application Publication No. 6-318249 (Patent Literature 10).

The techniques disclosed in Patent Literature 1 and Patent Literature 2 correspond to solving a potential by the steepest-decent method and can provide a dot pattern that has a good quality to some extent. However, for the known techniques of Patent Literature 1 and Patent Literature 2, it is necessary to calculate a repulsive force that acts between many points in solving the equation of motion as a multi-body problem, and computational complexity surges on the order of the square of the input size at worst. In recent years, because the number of dots required in the above scatter pattern has increased with the increase in the size of a liquid crystal display, the calculation time in the above-described known techniques is undesirably long, and these techniques are unsatisfactory from the viewpoint of supporting the increase in the device size.

BRIEF SUMMARY OF THE INVENTION

In order to overcome these deficiencies, the present invention provides an information processing apparatus for calculating a spatial arrangement of a plurality of elements of a discrete pattern, the plurality of elements being arranged in a spatially discrete manner, the information processing apparatus including: a placing unit configured to determine, for each of the elements, a density in an initial position given to the element from a density distribution of the elements in a region where the elements are arranged in the discrete pattern and configured to place, for each of the elements, a figure and a movement range of the figure, the figure having a size corresponding to the density and representing a region where the element repels other elements; a computation unit configured to minimize an objective function for imposing a penalty on each of a collision between the figures and a protrusion of the figure from the movement range using a position of each of the figures as a decision variable and configured to compute an optimal solution of the position of each of the figures; and an output unit configured to output the optimal solutions of the positions of the figures as the spatial arrangement of the elements.

According to another aspect, the present invention provides a calculation method for calculating a spatial arrangement of a plurality of elements of a discrete pattern, the plurality of elements being arranged in a spatially discrete manner, the calculation method being executable by a computer system, the calculation method including: determining, for each of the elements, a density in an initial position given to the element from a density distribution of the elements in a region where the elements are arranged in the discrete pattern and placing, for each of the elements, a figure and a movement range of the figure, the figure having a size corresponding to the density and representing a region where the element repels other elements; solving, by a computing step, an optimization problem so as to minimize an objective function for imposing a penalty on each of a collision between the figures and a protrusion of the figure from the movement range using a position of each of the figures as a decision variable and computing an optimal solution of the position of each of the figures; and outputting the optimal solutions of the positions of the figures as the spatial arrangement of the elements.

According to yet another aspect, the present invention provides a computer program product for achieving an information processing apparatus for calculating a spatial arrangement of a plurality of elements of a discrete pattern, the plurality of elements being arranged in a spatially discrete manner, the computer program product including: a computer readable storage medium having computer readable non-transient program code embodied therein, the computer readable program code including: computer readable program code configured to perform the steps of: determining, for each of the elements, a density in an initial position given to the element from a density distribution of the elements in a region where the elements are arranged in the discrete pattern and configured to place, for each of the elements, a figure and a movement range of the figure, the figure having a size corresponding to the density and representing a region where the element repels other elements; minimizing an objective function for imposing a penalty on each of a collision between the figures and a protrusion of the figure from the movement range using a position of each of the figures as a decision variable and configured to compute an optimal solution of the position of each of the figures; and outputting the optimal solutions of the positions of the figures as the spatial arrangement of the elements.

BRIEF DESCRIPTION OF THE SEVERAL VIEWS OF THE DRAWINGS

FIG. 3(A) illustrates a square as a virtual figure that defines a movement range $Q_i$ according to an embodiment of the present invention.

FIG. 3(B) illustrates a circle as a virtual figure that defines a movement range $Q_i$ according to an embodiment of the present invention.

FIG. 8 illustrates example scatter dot patterns for an LED light.

FIG. 11 is enlarged views of lower left corners in scatter dot patterns for reducing a dark shadow patch at the bottom left/right hand corner of an edge-lit type LCD backlight.

FIG. 12 illustrates a comparison between a result of a generated dot pattern according to an embodiment of the present invention and a result of a generated dot pattern in a conventional technique with respect to a scatter dot pattern for reducing a dark shadow patch at the bottom left/right hand corner of an edge-lit type LCD backlight.

FIG. 14(A) illustrates a scatter dot pattern using an ordered lattice and photographs of a liquid-crystal cell surface on which each of the scatter dot patterns is disposed.

FIG. 14(B) illustrates a scatter dot pattern using pseudo-random numbers and photographs of a liquid-crystal cell surface on which each of the scatter dot patterns is disposed.

DETAILED DESCRIPTION OF THE PREFERRED EMBODIMENTS

Figure 1:
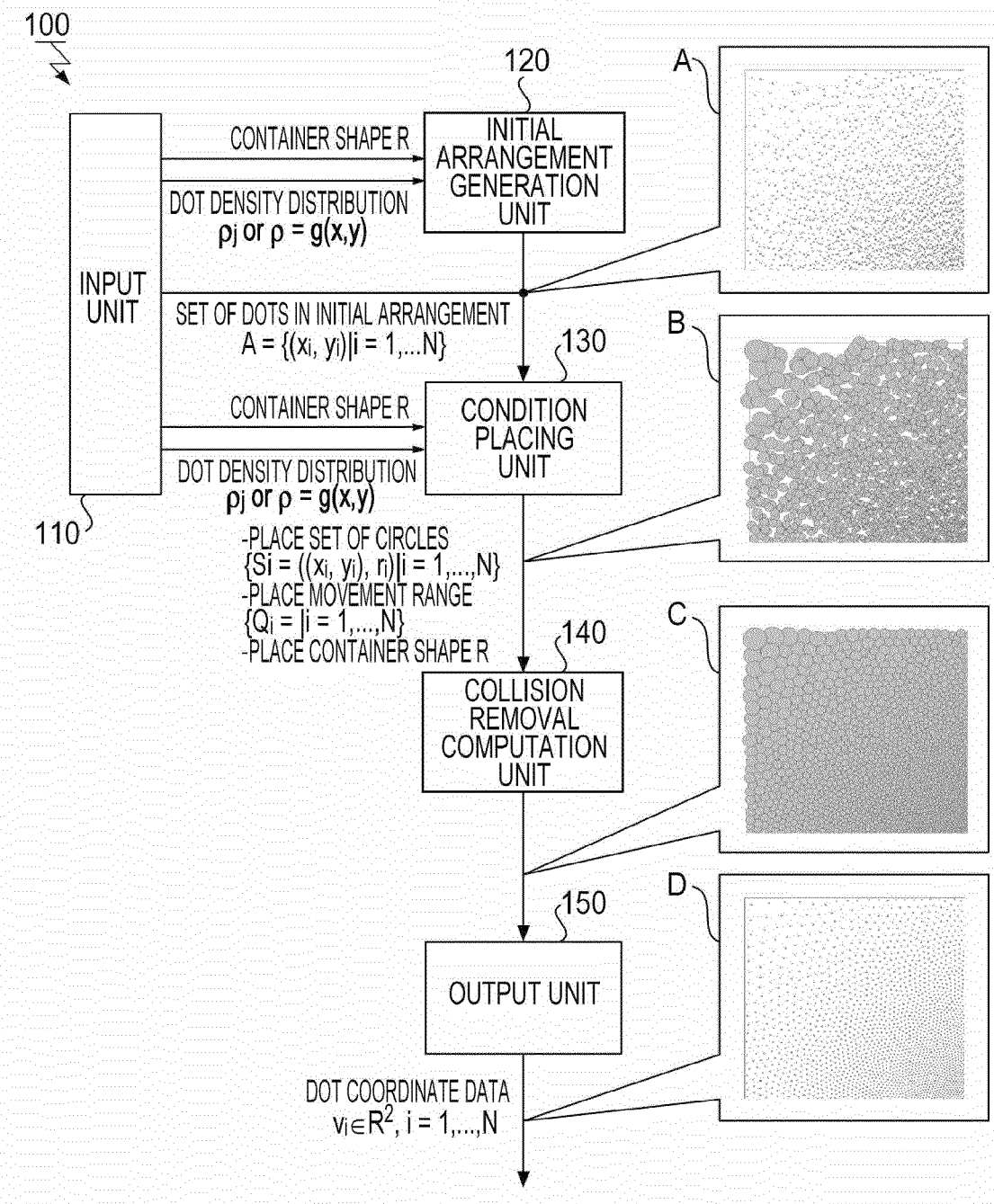
FIG. 1 is a functional block diagram of a dot-pattern generating apparatus according to an embodiment of the present invention.

An embodiment of the present invention will be described below. However, the present invention is not limited to the embodiment described below. In the embodiment described below, as an example of an information processing apparatus for computing a spatial arrangement of a plurality of elements of a discrete pattern, the plurality of elements being arranged in a spatially discrete manner, a dot-pattern generating apparatus for generating a dot pattern that defines an arrangement of minute scatterers used in a light guide plate or a diffuser sheet in a liquid crystal display backlight unit is described.

Overview

A dot-pattern generating apparatus according to an embodiment of the present invention performs an optimization operation on a two-dimensional arrangement of dots and generates a dot pattern including the dot being arranged in a uniformly discrete manner. In dot-pattern generating processing, first, a dot density distribution and an initial dot arrangement are provided.

When a dot pattern is applied to a scatter pattern of a light guide plate or the like of a LCD backlight unit, in order to make luminance distribution on a liquid-crystal cell uniform, a dot pattern having a variable filling factor is necessary, and a two-dimensional distribution of that filling factor is provided as design data. This filling factor corresponds to the above dot density. The above initial dot arrangement is one in which dots are arranged with a probability corresponding to the above dot density using a random function, such as pseudorandom numbers, or a low discrepancy sequence (LDS). At the initial arrangement stage, typically, an overlap may occur between dots and non-uniformity may occur in the dot distribution. In a liquid-crystal display device, if there is an overlap between dots in a scatter dot pattern, the overlapping part is visually recognized as a bright spot or a dark spot, and non-uniformity in dot distribution is perceived as luminance non-uniformity. Accordingly, the initial dot arrangement provided using, for example, the above LDS is difficult to be optically used if it is not processed.

Thus, in the dot-pattern generating processing according to an embodiment of the present invention, an interaction between dots is introduced, and the optimal solution (specifically, local optimal solution) of a nonlinear optimization problem in which a two-dimensional arrangement of dots is a decision variable is computed. By introducing an appropriate interaction into an irregular initial dot arrangement provided as an initial condition and making it uniform by optimization operation, an optically good-quality dot pattern that can be suitably used as a scatter dot pattern in, for example, a light guide plate can be generated. A desirable target dot pattern in an embodiment of the present invention is one that satisfies the conditions that the dot pattern is sufficiently irregular to a degree at which no moiré fringes occur between the dot pattern and a member containing a regular pattern, such as a prism sheet or a liquid-crystal cell, that the dot pattern is sufficiently uniform to a degree at which luminance non-uniformity is not visually recognized, and that the dot pattern has any continuous filling factor distribution.

In the dot-pattern generating processing according to an embodiment of the present invention, the above-described interaction between dots is introduced in an objective function by an evaluation function that places a figure that virtually represents a region in which a dot repels the others for each dot and that imposes a penalty on a collision between virtual figures for dots. The above-described virtual figure, more specifically a virtual circle, has a radius that is placed according to a dot density in a position provided as an initial condition for each dot so as to reproduce a filling factor distribution provided as design data. That is, for a dot arranged in a position corresponding to a small dot density, a circle having a relatively long radius is placed. On the other hand, for a dot arranged in a position corresponding to a large dot density, a relatively small circle is placed. In optimization operation, the objective function for imposing a penalty according to the degree of a collision between the above virtual circles is repetitively minimized using a method in which space complexity is linear, and the two-dimensional arrangement of the dots is optimized. This enables the providing of an optically good-quality dot pattern that satisfies conditions that the dot pattern is sufficiently irregular to a degree at which no moiré fringes occur between the dot pattern and a member containing a regular pattern, that the dot pattern is sufficiently uniform to a degree at which luminance non-uniformity is not visually recognized, and that the dot pattern has any continuous filling factor distribution.

Functional Block

A dot-pattern generating apparatus according to an embodiment of the present invention is described in greater detail below with reference to a functional block diagram. FIG. 1 is a functional block diagram of the dot-pattern generating apparatus according to the embodiment of the present invention. A dot-pattern generating apparatus 100 according to an embodiment of the present invention includes an input unit 110 configured to receive various kinds of design data and a parameter, an initial arrangement generation unit 120 configured to generate an initial arrangement of dots in accordance with the input design data and parameter, a condition placing unit 130, a collision removal computation unit 140, and an output unit 150. More specifically, the dot-pattern generating apparatus 100 includes a central processing unit (CPU), such as a single-core processor or multi-core processor, a cache memory, a random-access memory (RAM), and a storage device and achieves each functional portion and each processing under the control from an appropriate operating system with cooperation between hardware and software.

The input unit 110 receives container shape data that defines a region in which dots are arranged (hereinafter referred to as container), dot density distribution data for providing a dot density distribution in the container, and parameters that define other computational and design conditions. If a scatter dot pattern in a light guide plate in a liquid-crystal display backlight unit is used, for example, data corresponding to the shape of the region in which the scatterers are disposed is provided as the container shape data. Here, for the sake of convenience of description, an example in which container shape data occurring when the container is a rectangular frame is provided is described. The present invention is not limited to this example.

As the dot density distribution data, sequence data of dot densities in the respective partitions j (j=1, ..., M; M is the number of partitions) each having a predetermined size in which the container is divided may be provided, or alternatively, a function $g(x,y)$ for providing a continuous dot density distribution and its coefficient may be provided. In the present specification, in relation to the dot density, two kinds of densities are defined: a dot filling factor $\rho$ that represents the ratio of the total area occupied by dots to the area of a unit region and a point density d that represents the number of dots per unit area. In the illustrated embodiment, the dot filling factor $\rho$ is provided, and the above dot density distribution is provided as a sequence of dot filling factors $\rho_j$ in the respective partitions j.

The initial arrangement generation unit 120 generates an irregular initial dot arrangement corresponding to a dot density distribution provided to the input unit 110. The method for generating an initial dot arrangement may employ a method for determining a direct coordinate using pseudorandom numbers (simple pseudorandom number method), a method for perturbing displacement of a lattice point in an ordered lattice using pseudorandom numbers, a method using a low discrepancy sequence, and other methods. For the viewpoint of providing a dot arrangement in the initial state with appropriate uniformity and irregularity and, by extension, enhancing the quality of the dot pattern, the method using a low discrepancy sequence may preferably be employed.

Initial dot arrangement generating processing of generating an initial dot arrangement that is irregular in accordance with a dot density distribution using a low discrepancy sequence is described below. A low discrepancy sequence (LDS) is one in which an amount of a discrepancy $D_N$ at an N point that initially belongs to that sequence satisfies the condition represented by Expression (1) below. In Expression (1), C is a constant that is not dependent on the number N of dots and the discrepancy $D_N$ is the amount defined as Expression (2) below for a rectangular region $[0,1]^2$ defined by $0<x,y\leq1$. In Expression (2), $\#E(x,y)$ denotes the number of dots in a rectangular region $[0,x]\times[0,y]$ having a diagonal line of a line segment $(0,0)$-$(x,y)$ and N is the total number of dots. The portion inside the absolute value symbol is one in which the proportion of the area of the rectangular region is subtracted from the proportion of the number of dots. The discrepancy $D_N$ is zero when a point set is distributed densely and uniformly. Expression (2) can enable the discrepancy $D_N$ to be intuitively understood to be the amount representing an imbalance in the distribution of the point set.

$$D_N(LDS) \le C\frac{(\text{Log}N)^2}{N} \quad (1)$$

$$D_N = \sup_{(x,y)\in[0,1]^2} \left|\frac{\#E(x,y)}{N} - xy\right| \quad (2)$$

To generate an initial dot arrangement corresponding to a varying dot density described above, first, a container in which dots are arranged is divided into partitions each having a predetermined size. The total number of the partitions is expressed by M. A standardized three-dimensional LDS point set is generated in advance in the section (0,1), the partition k is selected from Expression (3) below, where $\rho_i$ is the dot filling factor in the partition i, and the dot position in that partition i is selected using a digit in the remaining LDS point set. In Expression (3), U denotes a digit in a low discrepancy set. By repeating the above process the number of times equal to the number of dots to be generated, an irregular initial dot arrangement corresponding to the dot density distribution is provided. For the processing details of generating an irregular initial dot arrangement corresponding to the dot density distribution using an LDS, Japanese Unexamined Patent Application Publication No. 2007-306576 (Patent Literature 1) can be referred to, for example.

$$\sum_{i=1}^{k} \rho_i = U \sum_{j=1}^{M} \rho_j \quad (3)$$

FIG. 1A illustrates a portion of an initial dot arrangement of a scatter dot pattern for use in light emitting device (LED) illumination generated by the initial arrangement generation unit 120. In FIG. 1A, the dots are arranged such that the dot density increases from the upper left to the lower right sections. The coordinate data of the set of dots A (={$(x_i,y_i)$|i=1, ..., N}) of the generated initial arrangement is stored in a storage unit provided by a storage device, such as a memory. In the illustrated embodiment, the initial arrangement generation unit 120 generates an initial dot arrangement using container shape data and dot density distribution data provided to the input unit 110. In other embodiments, existing initial dot arrangement data generated in advance using a method, such as the above-described LDS, may be provided as input data.

The condition placing unit 130 places a circle $S_i$ that virtually represents a region in which a dot repels the others for each dot i in the set of dots A (={$(x_i,y_i)$|i=1, ..., N} to introduce an interaction between dots. The circles $S_i$ has a radius $r_i$ corresponding to the dot filling factor $\rho$ in the initial position of the dot i and is placed such that its center is the initial position $(x_i,y_i)$ of the dot i. For a dot arranged in a position at which the dot density is small in the initial arrangement, a circle having a long radius, that is, a large exclusion range is placed; for a dot arranged in a position at which the dot density is large, a circle having a short radius, that is, a small exclusion range is placed. Because the radius $r_i$ of the circle $S_i$ can affect the optical quality of a final dot pattern, a method for determining the radius $r_i$ of the circle $S_i$ is described in detail below.

Figure 2:
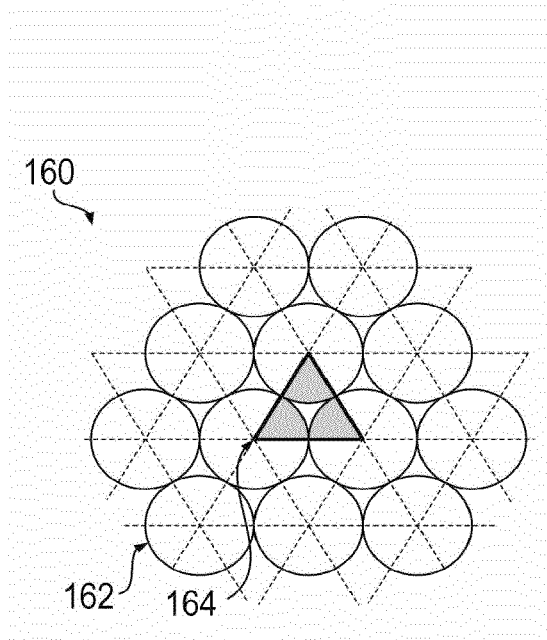
FIG. 2 illustrates a hexagonal lattice of circles.

A close-packed arrangement of circles in an infinite space is a hexagonal lattice of circles. A method for determining a radius of a circle according to an embodiment determines the radius of the circles on the assumption that circles are arranged by a hexagonal lattice. FIG. 2 illustrates a hexagonal lattice 160 of circles. As illustrated in FIG. 2, in the hexagonal lattice 160, a semicircle is arranged in a region 164 corresponding to a single equilateral triangle. Therefore, a point density d of a circle 162 having a radius r' in the hexagonal lattice can be represented by the following Expression (4):

$$d = \frac{\text{Number of Circles } (=1/2)}{\text{Area of Equilateral Triangle}} = \frac{1}{2\sqrt{3}\,r'^2} \quad (4)$$

The relationship between the circle (dot) point density d and the filling factor $\rho$, which represents the proportion of the area occupied by dots, can be represented by Expression (5) below. Thus the radius r' of a circle arranged in a container instead of a dot can be determined using Expression (6) below. In Expressions (5) and (6), $r_0$ denotes the dot radius and can be provided as a design parameter, for example.

$$\rho = d\pi r_0^2 = \frac{\pi r_0^2}{2\sqrt{3}\,r'^2} \quad (5)$$

$$r' = r_0 \sqrt{\frac{\pi}{2\sqrt{3}\,\rho}} \quad (6)$$

In the hexagonal lattice 160, the circles are just in contact with each other. Thus an experimental observation is that the use of a slightly large radius, rather than the radius r' in the close-packed state, would enable non-uniformity in a final arrangement to be efficiently removed because a collision of circles would appropriately occur. From this observation, in the illustrated embodiment, the dot filling factor provided to each partition j in all partitions D (={$[s_j,t_j]\times[u_j,w_j]$|j=1, ..., M}) in which a container R is divided is $\rho_j$, and the radius $r_i$ of the dot i arranged in the initial position $(x_i,y_i)$ can be suitably determined from Expression (7) below using a predetermined constant a satisfying the inequality in Expression (7). In Expression (7), the constant a may preferably have a magnitude of the order of $\pi/\sqrt{3}$.

$$(x_i, y_i) \in [s_j, t_j] \times [u_j, w_j] \Rightarrow r_i = r_0\sqrt{\frac{a}{\rho_j}} > r_0\sqrt{\frac{\pi}{2\sqrt{3}\,\rho_j}} \quad (7)$$

Expression (7) above represents a relational expression used in the embodiment, in which the dot density distribution is provided as sequence data for each section. If a function for directly providing the dot density distribution is input, $r_i$ can be directly calculated from the initial position $(x_i,y_i)$ for each dot i using Expression (6) above and its function. Expression (7) above represents a computational expression used when a dot shape in a scatter dot pattern is a circle. A dot may have various geometrical shapes, other than a circle. In such cases, the above radius $r_0$ can be placed by conversion of a size defined in a dot into the above circle, or alternatively, a method for approximating a geometrical shape of a dot using a plurality of circles, the method to which the technique disclosed in T. Imamichi, et al., "A multi-sphere scheme for 2D and 3D packing problems," In SLS 2007: Proceedings of Engineering Stochastic Local Search Algorithms. Designing, Implementing and Analyzing Effective Heuristics, Volume 4638 of Lecture Notes in Computer Science, 207-211, Springer, 2007 (Non-patent Literature 1) is applied, may be employed.

FIG. 1B illustrates a portion of a set of circles placed by the condition placing unit 130. In FIG. 1B, the circles are arranged such that they have distribution of radiuses corresponding to the dot density distribution illustrated in FIG. 1A. It is understood from FIG. 1B that, in the initial dot arrangement made by a method such as LDS, an imbalance in the dots clearly exists, that is, the dots are not uniform. The set of circles $S_i$ (={(($x_i,y_i$),$r_i$)|i=1, ..., N}) is stored in a storage unit provided by a storage device, such as a memory, and is referred to in computation performed by the collision removal computation unit 140, which is described below.

In the illustrated embodiment, although the details are described below, in addition to circles used in introducing the above interaction between the dots, a movement range $Q_i$ defining a movable range for each dot i (i=1, ..., N) such that the dot is not allowed to move away from the initial arrangement in a computational process is placed. The movement range $Q_i$ has a size corresponding to the dot filling factor $\rho$ in the initial position ($x_i,y_i$) of the dot i and is represented by a virtual figure arranged such that its center is the initial position ($x_i,y_i$) of the dot i. The limitation of the dot i imposed by the movement range $Q_i$ is incorporated in optimization processing by introducing an evaluation function for imposing a penalty on an occurrence in which the above circle $S_i$ projects from the figure representing the movement range $Q_i$ into the objective function.

The movement range $Q_i$ may be a region having various figures, such as a circle, a rectangle, and other polygons. It may preferably be a square illustrated in FIG. 3(A) or a circle illustrated in FIG. 3(B), from the viewpoint of simplicity of calculation for evaluating an interaction. The size of the movement range $Q_i$ may preferably be a size corresponding to the dot filling factor $\rho$ in the initial position ($x_i,y_i$) of the dot i, similar to the radius $r_i$ of a circle, and may be placed so as to be dependent on the radius $r_i$ of the circle placed in the dot i. For example, the movement range $Q_i$ may be placed as a square with a side of $4r_i$ or a circle with a diameter of $4r_i$. In the illustrated embodiment, the movement range $Q_i$ is defined using a square with a side of $4r_i$ such that its center is the initial position ($x_i,y_i$) of each dot i.

Furthermore, in the illustrated embodiment, although the details are described below, a virtual figure of the container R defining a region in which a dot can be arranged can be placed using container shape data input to the input unit 110, in addition to the interaction between dots and the limitation of the movement range in which the initial position is the center. The above limitation by the container R is incorporated in optimization processing by introducing an evaluation function for imposing a penalty on an occurrence in which the above circle $S_i$ projects from the figure representing the container R into the objective function. In the illustrated embodiment, a rectangular region having a size corresponding to a shape of a region in which scatterers are disposed is provided as the container R.

The collision removal computation unit 140 performs non-linear optimization operation using the position coordinates ($x_i,y_i$) of the circle (dot) as a decision variable employing the container R placed by the above condition placing unit 130, the circle $S_i$ of each dot, and the movement range $Q_i$ of each dot. More specifically, the collision removal computation unit 140 finds a local optimal solution of the position coordinates of the circle (dot) by repeatedly minimizing the objective function in which three kinds of penalties for a collision between circles, a protrusion from a circle container, and a protrusion from a movement range of a circle are summed using a method in which space complexity is linear.

FIG. 1C illustrates a portion of a set of circles in which the position coordinates ($x_i,y_i$) are optimized by the collision removal computation unit 140. It is understood from FIG. 1C that the arrangement of circles illustrated in FIG. 1C has uniformity better than that in the arrangement of circles illustrated in FIG. 1B. The final set of circles $S_i$ (={(($x_i,y_i$), $r_i$)|i=1, ..., N}) is stored in a storage unit, such as a memory, as a result of the computation. The output unit 150 outputs position coordinate data in which a sequence of the position coordinates ($x_i,y_i$) of a circle $S_i$. FIG. 1D illustrates a dot pattern based on the position coordinate data output from the output unit 150. It is understood from FIG. 1D that a dot distribution that is more uniform than that in the initial dot arrangement illustrated in FIG. 1A is achieved.

Non-Linear Optimization Processing

The non-linear optimization processing performed by the collision removal computation unit 140 according to the embodiment of the present invention is described below in detail. The optimization problem solved by the collision removal computation unit 140 is formulated as the unconstrained nonlinear optimization problem represented by Expressions (8) and (9) below, where the central coordinates of a circle $S_i$ is expressed by a position vector vi (=($x_i,y_i$)), the penetration depth of two figures A and B is expressed by $\delta(A,B)$, and the Minkowski sum is expressed by a symbol of circled plus. In Expression (8), R with a bar denotes a region outside the container R (complementary set), and Q with a bar denotes a region outside the movement range $Q_i$. The penetration depth $\delta(S_i,S_j)$ denotes the degree of a collision between the circle Si and circle $S_j$, the penetration depth $\delta(S_i,\overline{R})$ denotes the degree of a protrusion of the circle $S_i$ from the container R, and the penetration depth $\delta(S_i,\overline{Q_i})$ denotes the degree of a protrusion of the circle $S_i$ from the movement range $Q_i$, and these impose the above-described three kinds of penalties.

$$\text{minimise} \sum_{1 \le i < j \le n} \delta(S_i \oplus v_i, S_j \oplus v_j)^2 + \quad (8)$$

$$\sum_{1 \le i \le n} \delta(S_i \oplus v_i, \overline{R})^2 + \sum_{1 \le i \le n} \delta(S_i \oplus v_i, \overline{Q_i})^2$$

$$\text{subject to: } v_i \in R^2, i = 1, \ldots, n. \quad (9)$$

The Minkowski sum of the figure A and the position vector v represents translation of the figure A, as expressed in Expression (10) below. Accordingly, the Minkowski sum of the circle $S_i$ and the position vector $v_i$ in each of the penetration depth functions represents the circle $S_i$ having the center lying in the position defined by the position vector $v_i$. The penetration depth $\delta(A,B)$ of the two figures A and B is defined as the distance of translation required for removing the collision between the two figures A and B when the translation in any direction is allowed, as expressed in Expression (11) below. In Expression (11), $\|\ldots\|$ denotes a Euclidean norm (distance), and $\phi$ denotes an empty set.

$$A \oplus v = \{a + v \mid a \in A\} \quad (10)$$

$$\delta(A, B) = \min_{v \in R^2} \{\|v\| \mid (A \oplus v) \cap B = \emptyset\} \quad (11)$$

Figure 4:
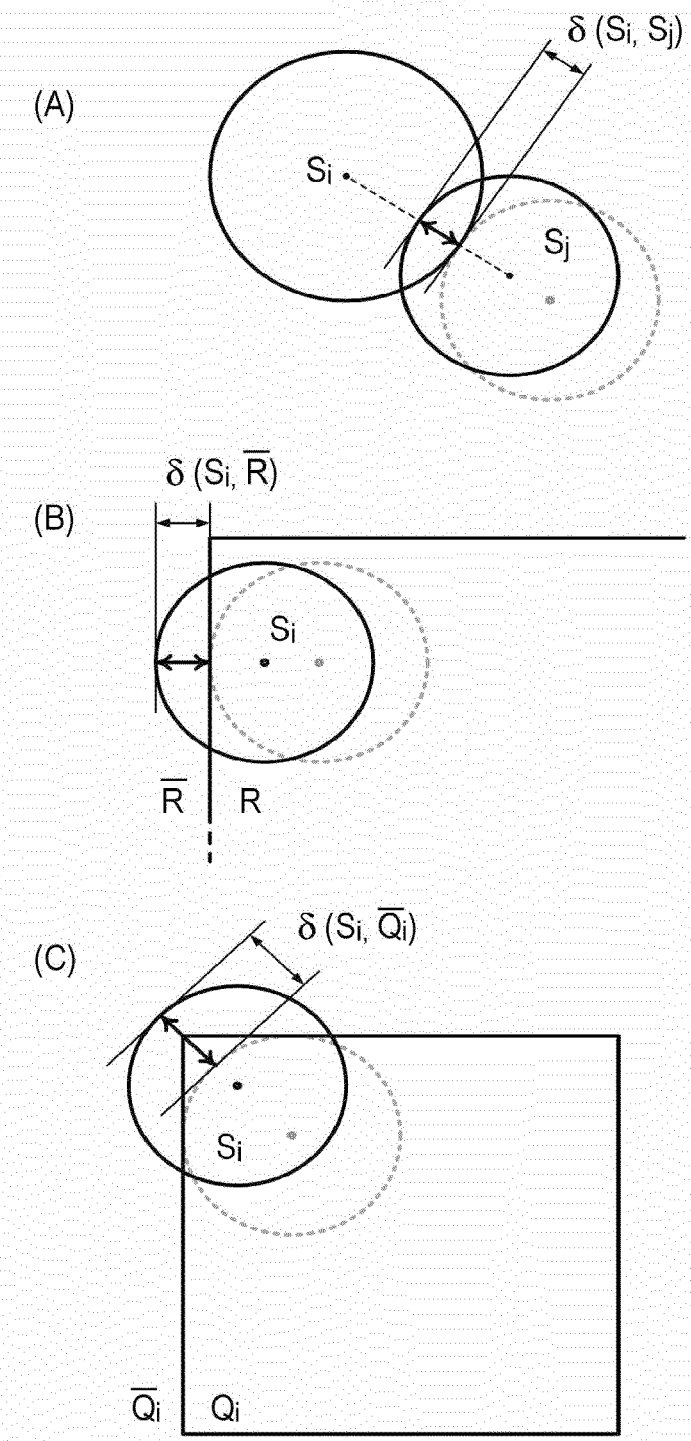
FIG. 4(A) illustrates a penetration depth $\delta(S_i, S_j)$ of circles.
FIG. 4(B) illustrates a penetration depth $\delta(S_i, \bar{R})$ between a circle and a figure that represents the region outside a container.
FIG. 4(C) illustrates a penetration depth $\delta(S_i, \bar{Q}_i)$ between a circle $S_i$ and a figure that represents the region outside a movement range.

That is, the penetration depth $\delta(S_i,S_j)$, which represents the degree of a collision between circles, is the distance of translation required for removing the collision between the circle $S_i$ and the circle $S_j$. If the circle $S_i$ and the circle $S_j$ overlap each other, the penetration depth $\delta(S_i,S_j)$ can be found as the difference $(r_i+r_j-\|v_i-v_j\|)$ between the sum of the radiuses of the circles and the distance between the centers (the thick arrows in FIG. 4(A)). If the circle $S_i$ and the circle $S_j$ do not overlap ($S_i \cap S_j = \phi$), the penetration depth $\delta(S_i,S_j)$ is zero. The penetration depth $\delta$ ($S_i$,R with a bar), which represents the degree of a protrusion of the circle $S_i$ from the container R, is the distance of translation required for removing a collision between the circle $S_i$ and the figure representing the region (R with a bar) outside the container (the thick arrows in FIG. 4(B)). Similarly, the penetration depth $\gamma(S_i,Q_i$ with a bar), which represents the degree of the circle $S_i$ from the movement range $Q_i$, is the distance of translation required for removing a collision between the circle $S_i$ and the figure representing the region outside the movement range (the thick arrows in FIG. 4(C)).

The objective function represented by Expression (8) above is made up of the first term for imposing a penalty in accordance with the degree of a collision between circles, the second term for imposing a penalty in accordance with the degree of a protrusion of a circle from the container, and the third term for imposing a penalty in accordance with the degree of a protrusion of a circle from the movement range. Each of the terms is a two-dimensional non-linear term. As a result, the objective function is a multimodal function that can be differentiated. Thus the non-linear optimization problem expressed by Expressions (8) and (9) above can converge to a local optimal solution at high speed using a method in which space complexity is linear, such as a limited memory Broyden-Fletcher-Goldfarb-Shanno (L-BFGS) method, a trust region method, a conjugate gradient method, a Barzilai-Borwein method, or another method. In the illustrated embodiment, each of the first to third terms in the objective function expressed in Expression (8) is a two-dimensional non-linear term. The objective function is merely required to be a function that can be differentiated and that has differential continuity. In other embodiments, the order of the penetration depth $\delta$ can be a value larger than one. In the objective function, a weight may be assigned to each of the first to third terms.

As one example of a method in which space complexity is linear, the method being usable in the non-linear optimization processing executed by the collision removal computation unit 140 according to an embodiment of the present invention, an L-BFGS method is described below. The L-BFGS method is one example of a quasi-Newton method and is a limited memory variation of the BFGS method. The L-BFGS method is an algorithm that does not calculate a Hessian matrix in a Newton's method and forms a column of a matrix that converges to the inverse Hessian matrix by successive approximation using a gradient vector. Expression (12) below represents a main update expression in the L-BFGS method. In Update Expression (12), $\alpha k$, Hk, and $\nabla f(zk)$ denote, in a k-th iteration, the step width determined by one-dimensional search, the approximate matrix, and the gradient vector of the objective function f(zk), respectively. By iterations executed with respect to Update Expression (12) until a predetermined convergence condition or stopping condition is satisfied, the position vector zk (=$\{v_i|i=1, \ldots, N\}$) can converge to a local optimal solution.

$$z_{k+1}=z_k-\alpha_k H_k \nabla f(z_k) \quad (12)$$

In the above objective function in Expression (8), a term for calculating the penetration depth $\delta(S_i,S_j)$ for each combination of pairs of circles remains. In an embodiment of the present invention, an interaction between dots is represented by a collision between circles placed for the respective dots, and the dot-pattern generating processing ends in an issue of removing or minimizing the collision of circles. Therefore, it is not necessary to deal with an interaction between circles that are remote from each other. Accordingly, there is no need to compute an interaction between dots of every combination, as in the case where a multi-body problem is solved by introducing a repulsive force, and thus a local optimal solution is obtainable at high speed.

For the above interaction between remote circles, the use of an algorithm for detecting a collision between circles enables computation for these remote circles, whose collision is undetectable, to be omitted. Preferable examples of the algorithm for detecting a collision between circles can include a method of enabling a collision between circles in all of the circles to be detected at high speed by dividing a space in which circles are arranged into a plurality of zones, detecting a collision between circles in each zone, and omitting the calculation for at least a pair of circles whose collision with each other is impossible because they do not belong to the same zone, such as a slab partitioning method and a plane sweep method.

Figure 5:
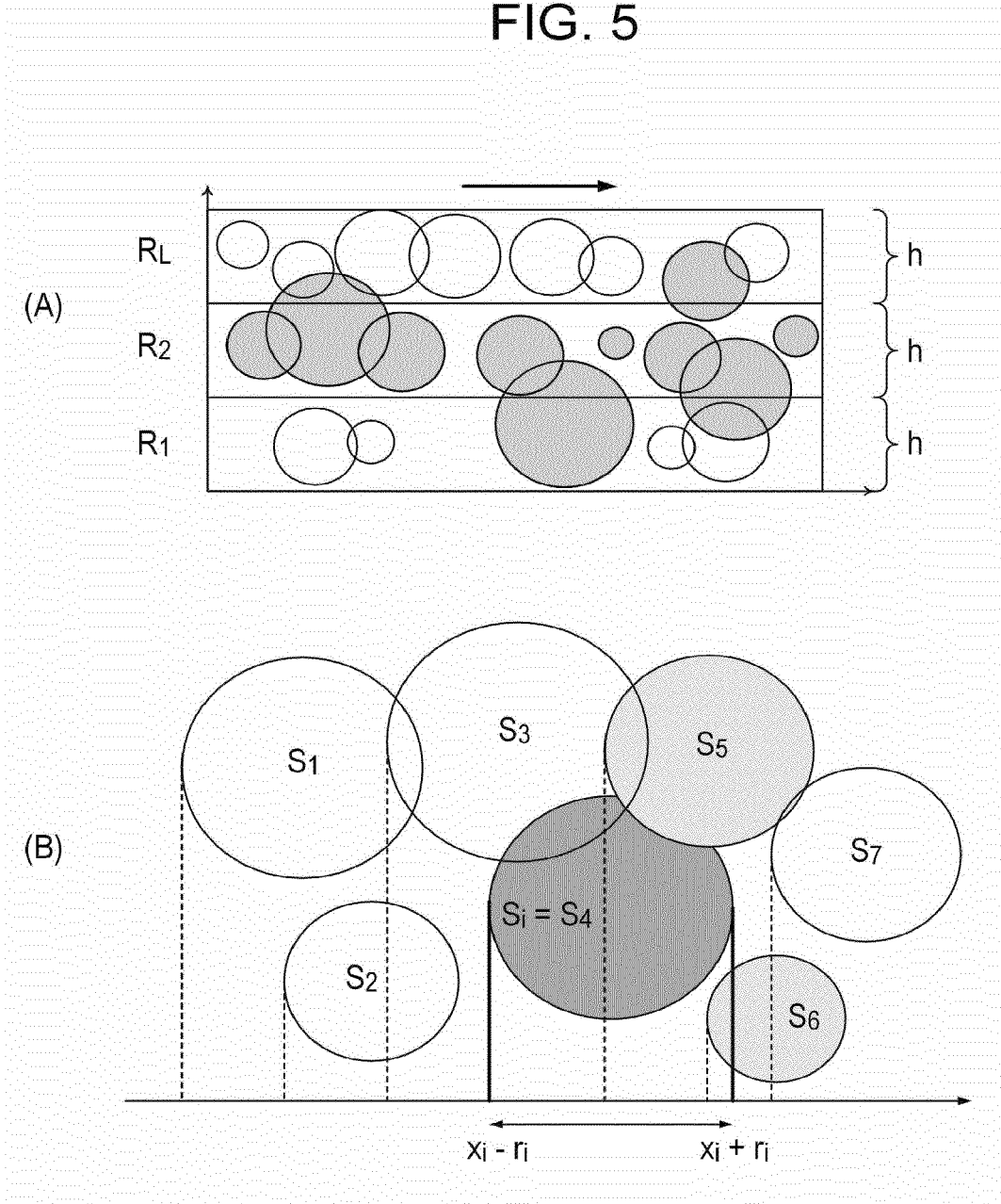
FIG. 5 is illustrations for describing a detection method for detecting a collision of circles to which a slab partitioning method and a plane sweep method are applied, the detection method being applicable to an embodiment of the present invention.

FIG. 5 is two illustrations for describing a method for detecting a collision between circles, the method being applicable to the optimization operation processing of the present embodiment, the method employing a combination of a slab partitioning method and a plane sweep method. With the algorithm for detecting a collision between circles according to the present embodiment, as illustrated in FIG. 5(A), first, the container R in which dots are arranged is divided into a plurality of slabs R1, R2, . . . , RL having the same width h, and each of circles $S_i$ is assigned to a slab with which the circle $S_i$ intersects. In FIG. 5(A), shaded circles indicate circles assigned to the slab R2. A pair of circles that collide with each other is assigned to at least one slab, and with an appropriate width h($>2r_{max}$, where $r_{max}$ is the maximum radius of a circle), it can be assigned to two neighboring slabs at the maximum. In each slab, a collision between circles is detected by the plane sweep method. A set operation for pairs of circles colliding with each other in the slabs is performed, thus enabling all the pairs of circles colliding with each other to be obtained without duplication. In FIG. 5(A), the thick arrow indicates the direction of plane sweeping. Here, it is assumed that the sweeping proceeds from left to right.

With the plane sweep method, the circles assigned to the slabs are sorted in ascending order of the left end position $(x_i-r_i)$ of the circle, and it is determined whether, for a pair of circles $(S_i,S_j)$, the conditions that the circle $S_j$ is on the right of the circle $S_i$ ($i<j\leq N$) and that the left end position $(x_j-r_j)$ of the circle $S_j$ is on the left of the right end position $(x_i+r_i)$ of the circle $S_i$ ($x_i+r_i>x_j+r_j$) are satisfied. When the left end of the circle $S_j$ on the right of the circle $S_i$ is on the left of the right end of the circle $S_i$, the circles $S_i$ and $S_j$ are detected as a pair of circles that can collide with each other. In the example illustrated in FIG. 5(B), when a circle $S_4$ is of interest, circles $S_5$ and $S_6$ are detected as pairs that can collide with the circle $S_4$. For the details of the collision detection algorithm based on the slab partitioning and the plane sweep method, T. Imamichi, et al., "Performance Analysis of a Collision Detection Algorithm of Spheres Based on Slab Partitioning, "IEICE Transactions on Fundamentals of Electronics, Communications and Computer Sciences, Volume E91-A, Issue 9, 2308-2313, September 2008 (Non-Patent Literature 2) can be referred to.

Hardware

Figure 6:
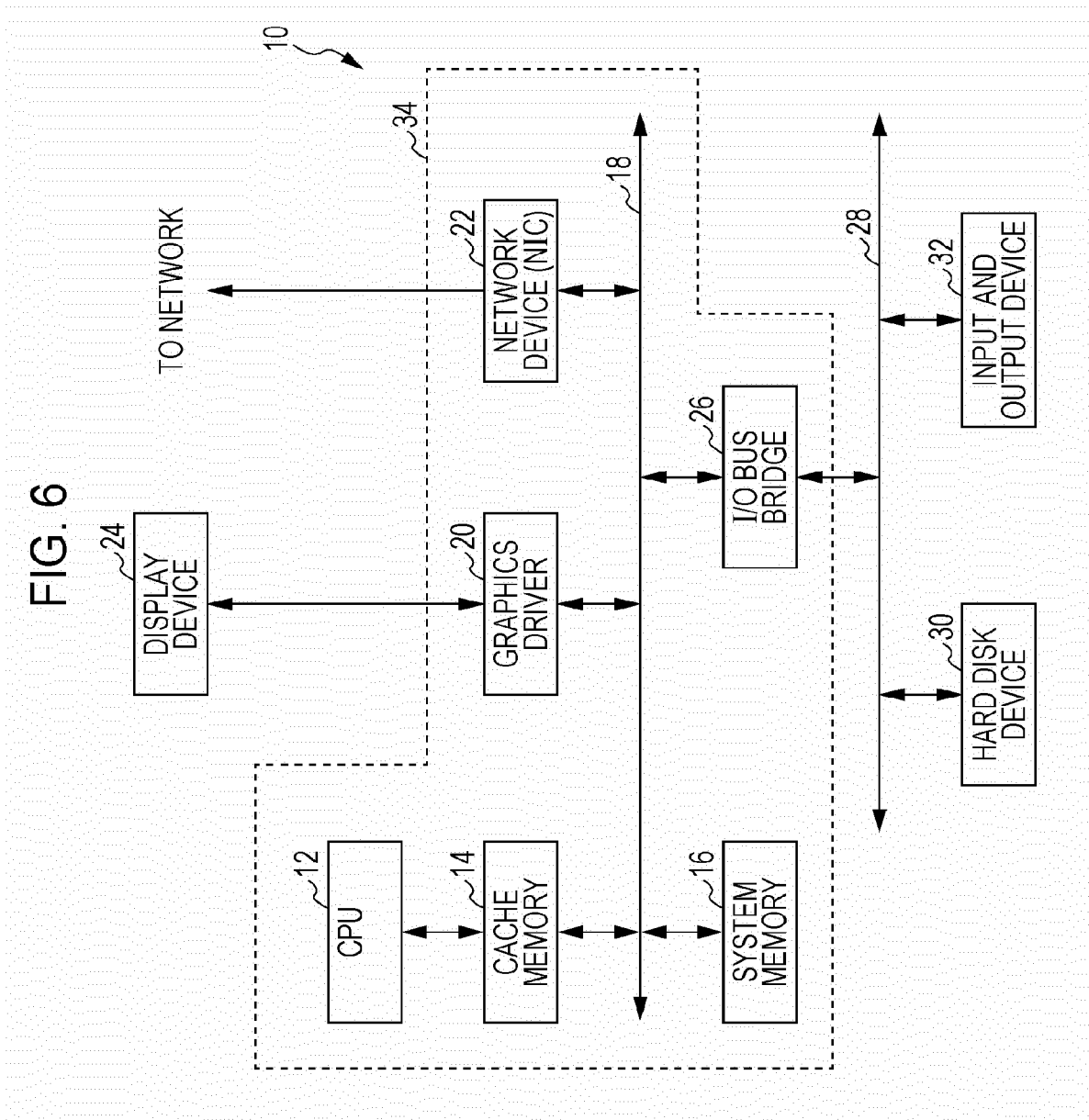
FIG. 6 is a hardware block diagram of a dot-pattern generating apparatus according to an embodiment of the present invention.

A hardware configuration of the dot-pattern generating apparatus according to an embodiment of the present invention is described below. FIG. 6 is a hardware block diagram of a dot-pattern generating apparatus 10 according to an embodiment of the present invention. The dot-pattern generating apparatus 10 illustrated in FIG. 6 is configured as a computer apparatus 34 and includes a central processing unit (CPU) 12, a cache memory 14 having levels, such as L1 and L2, at which data used by the CPU 12 can be accessed with high speed, and a system memory 16 made of a solid state memory element that enables processing performed by the CPU 12, such as a random-access memory (RAM) or a dynamic RAM (DRAM). The system memory 16 provides a storage region for storing dot density distribution data, initial dot arrangement data, and an in-progress result and a final result of the above optimization operation.

The CPU 12, the cache memory 14, and the system memory 16 are connected to other devices and drivers, for example, a graphics driver 20 and a network device (NIC) 22 through a system bus 18. The graphics driver 20 is connected to a display device 24 through a bus and causes a result of the above dot-pattern generating processing on the display screen. The network device 22 connects the dot-pattern generating apparatus 10 in the transport layer level and the physical layer level to a network that uses an appropriate communication protocol, such as the transmission control protocol/internet protocol (TCP/IP).

The system bus 18 is connected to an I/O bus bridge 26. The downstream side of the I/O bus bridge 26 is connected to a storage device 30, such as a hard disk, with integrated drive electronics (IDE), AT attachment (ATA), AT attachment packet interface (ATAPI), serial ATA, small computer systems interface (SCSI), or universal serial bus (USB), through an I/O bus 28, such as peripheral component interconnect (PCI). The I/O bus 28 is connected to an input and output device 32, such as a pointing device, for example, a keyboard or a mouse, through a bus, such as USB. Through the input and output device 32, an operator can input the above design data and design parameters and provide an instruction to execute the dot-pattern generating processing.

Examples of a used operating system (OS) can include Mac OS®, Windows®, Windows® 200X server, UNIX®, AIX®, LINUX®, and other appropriate operating systems.

Applications of Dot Pattern

Figure 7:
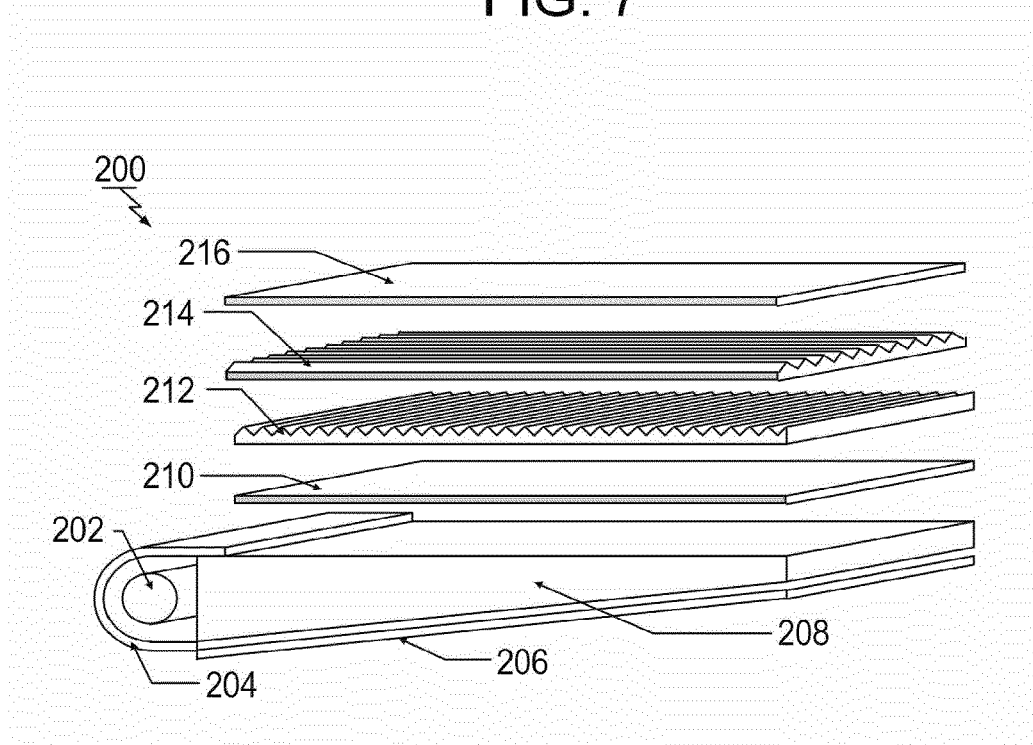
FIG. 7 illustrates a typical structure of a backlight unit for an edge-lit type LCD.

One example of an application of a dot pattern generated by the dot-pattern generating apparatus 10 according to an embodiment of the present invention is illustrated below. FIG. 7 illustrates a typical structure of a backlight unit for an edge-lit type LCD. A backlight unit 200 illustrated in FIG. 7 includes a cold cathode fluorescent lamp (CCFL) 202, a CCFL reflector 204, a reflective sheet 206 for reflecting light emitted from the CCFL 202, and a light guide plate 208 for guiding light emitted from the CCFL 202. The CCFL reflector 204 surrounds the CCFL 202 disposed on one side of the light guide plate 208 and collects light on the incident surface of the light guide plate 208 to maximize efficiency of the light source. The backlight unit 200 further includes a diffuser sheet 210, vertical and horizontal optical collimators 212 and 214, and a protective sheet 216 above the light guide plate 208. The diffuser sheet 210 diffuses light by scattering unidirectional light passing from the surface of the light guide plate to make the light evenly spread over the surface of the light guide plate 208. The optical collimators 212 and 214 refract light from the diffuser sheet 210, condense it, and enhance luminance on the backlight surface.

Light emitted from the CCFL 202 repeats being scattered on the lower surface of the light guide plate 208 and being totally reflected on the upper surface and exits from the light guide plate 208 at a location where the total reflection condition is not satisfied. To cause scattering or diffuse reflection, a dot pattern of a white pigment is printed on the lower surface of the light guide plate 208 or an array of dot-pattern minute structures (for example, rectangular depressions) is formed thereon. Printing data of the dot pattern of the white pigment or mask pattern data for use in photolithography forming the array of the minute structures disposed on the lower surface of the light guide plate 208 can be generated from coordinate data output from the dot-pattern generating apparatus 10 according to the present embodiment.

With the above-described embodiment, an interaction between dots is expressed by a collision between circles placed for the respective dots, and the dot-pattern generating processing ends in an issue of removing or minimizing collisions of circles. Accordingly, it is not necessary to deal with an interaction between circles (dots) that are remote from each other, and a local optimal solution of a non-linear optimization problem can be obtained with high speed. In the obtained local optimal solution in a spatial arrangement of dots, collisions of dots, excess proximity, and non-uniformity of the distribution are cancelled by removal of collisions of figures having sizes corresponding to the dot density distribution. Thus an optically good-quality dot pattern that satisfies conditions that it is sufficiently irregular to a degree at which no moiré fringes occur between the dot pattern and a member containing a regular pattern, that it is sufficiently uniform to a degree at which luminance non-uniformity is not visually recognized, and that it has any continuous filling factor distribution can be provided.

The conventional techniques disclosed in Patent Literature 1 and Patent Literature 2 solve the equation of motion as a multi-body problem, correspond to solving a potential by a steepest-descent method, and can provide a dot pattern that has a good quality to some extent. However, it is necessary to calculate a repulsive force of many points in solving the equation of motion, and computational complexity of the order of the square of an input size at the worst is required.

In contrast, for optimization operation according to the embodiment of the present invention, the use of a method of removal of collisions of figures, which is practically better than the steepest-decent method, enables convergence on an equilibrium state with high speed the number of times equal to or less than that in the steepest-descent method. For the optimization operation according to the embodiment of the present invention, appropriately placing the radius of a circle corresponding to the dot density makes collisions of circles moderate and also shortens the calculation time in a single iteration. In addition, appropriately placing the radius of a circle corresponding to the dot density ensures generation of an optically good-quality dot pattern. Furthermore, because the movement range $Q_i$, in which each dot can move, is defined such that its center is the initial position, a decrease in which dots partly escape to a blank region, such a decrease being observed in the conventional techniques disclosed in Patent Literature 1 and Patent Literature 2, can be reduced.

Applications and operational advantages of the dot-pattern generating apparatus according to the embodiment of the present invention are described below with reference to a specific procedure of designing a diffuser sheet for use in a LCD. A use case described below relates to a diffuser sheet for use in a small terminal, the diffuser sheet including a 7-inch diagonal liquid-crystal display. A conventional technique follows a design procedure described in (1) to (5) below to one kind of the diffuser pattern product.

(1) First, a luminance distribution in a light emitting display device that is a target for reducing luminance non-uniformity is measured. To this end, a time of one hour to a half day may be required.

(2) Then, data on a filling factor distribution is calculated.

To repeat evaluations of tests, typically, several filling factor distribution data elements are generated. In some cases, data for a location in which peculiar luminance non-uniformity occurs, such as a location adjacent to the light source, a central portion, or a location opposite to the light source, and data for the other regions may be individually calculated, and the results may be combined. In those cases, the number of the filling factor distribution data elements is the number of combinations of the locations.

The measured luminance distribution has large random noise if it is not processed, so it may be unable to be used as design data for a dot pattern. Even with a filling factor distribution that provides a specific light source with an ideal luminance distribution, if the filling factor distribution itself has random noise, because a multiplicity of uses as a dot pattern is not achieved, the quality is considered to be poor. Accordingly, the luminance distribution is smoothened in the X direction, Y direction, or two-dimensionally, and filling factor distribution data for improving the smoothened measured luminance distribution as the initial state is calculated.

Generation of one pattern of the filling factor distribution data needs several hours. If nine (=three design policies×three locations) data elements are prepared for one kind of product, a time of approximately one to two days with one worker is needed.

(3) Dot-pattern generating processing is performed using the filling factor distribution data.

With a 7-inch diagonal display for a LCD in the present use case, 700,000 dots over the surface are needed. In a conventional technique, 7 to 12 hours may be needed for one calculation.

If a plurality of filling factor distribution data elements are used, because calculations are performed based on the number of patterns (the number of combinations of divided locations), in the case of nine data elements, a time of approximately three to five days is needed.

(4) After completion of an optimal pattern design, in the generated dot pattern, a task of removing a remaining excess proximal dot and removing a dot escaping to a blank region is manually performed on a computer aided design (CAD) system. The time required for the task is dependent on the number of pairs of remaining excess dots or the number of dots described above. In some cases, a time of approximately several hours with one worker to several days with several workers may be needed.

(5) The dot coordinate data is sent to a mask maker. A diffuser sheet is produced from a mask.

Accordingly, with a conventional technique, approximately 10.5 days are needed with 2 to 3 workers under a certain condition. In contrast to this, in a dot-pattern generating processing according to the embodiment of the present invention, the above-described calculation (3), which needs approximately three to five days in a conventional technique, is completed in several hours (within one day), and the task (4) is basically unnecessary. Accordingly, with the dot-pattern generating processing according to the embodiment of the present invention, even under the same condition as in the above-described conventional condition, the processing can be completed in approximately 3.0 days with one worker in total. If a target display has a larger size, the difference between the embodiment of the present invention and the above-described conventional technique would be clearer.

As described above, with the embodiment of the present invention, a virtual circle is placed for a dot, an interaction based on a collision between the circles is introduced, and an optimization operation is performed such that the collision between the circles is removed. Accordingly, an information processing apparatus, a calculation method, a program, and a storage medium that can generate a good-quality dot pattern with high speed can be provided.

The dot-pattern generating apparatus 100 according to the embodiment of the present invention is described as one that outputs position coordinate data in which a sequence of positional coordinates of each dot in a dot pattern is described. However, in other embodiments, the dot-pattern generating apparatus can be configured as an illumination design analysis apparatus in which the function of generating position coordinate data for a dot pattern of the present invention is incorporated or a mask pattern generating apparatus.

The dot-pattern generating apparatus according to an embodiment of the present invention can be provided by loading a computer-executable program containing non-transient program code into a computer apparatus and achieving the functional units. Examples of that program can include computer-executable programs described by legacy programming languages, such as FORTRAN, COBOL, PL/I, C, C++, Java®, Java® Beans, Java® Applet, Java® Script, Perl, and Ruby, and a computer-executable language described by an object-oriented programming language. The program can be stored in a computer-readable program and distributed.

Implementation

Processing of generating a scatter dot pattern performed by the dot-pattern generating apparatus according to an embodiment of the present invention is described below using specific implementations, which are not intended to limit the present invention.

1. IMPLEMENTATION IN COMPUTER

A computer system in which a program of the dot-pattern generating apparatus according to the embodiment of the present invention is implemented using a multi-core processor (Intel® Core® 2DuoT9300) with a clock frequency of 2.5 GHz and ThinkPad® X61 having a RAM of 4 GB was configured. The operating system used in the computer system is WINDOWS® XP, and the programming language of the above-described program is C++. An initial dot arrangement is provided by a method using the above low discrepancy sequence, and an optimization operation is implemented using the L-BFGS method. A comparison in which a program of the dot-pattern generating apparatus described in Patent Literature 1 and Patent Literature 2, that program obtaining a dot pattern by defining an interaction force between dots and solving a multi-body problem, is implemented in a computer system that is substantially equal to the above system was prepared.

2. EXPERIMENTAL EXAMPLES

A design condition is that the movement range $Q_i$ was a square having a side of $4r_i$ where $r_i$ is the radius of a circle, the constant a in the above Expression (7) for determining the radius $r_i$ is $\pi/\sqrt{3}$, and the dot diameter $2r_o$ is 46 μm.

2.1. Experimental Example 1 (Implementation)

A design condition is that, in addition, the container R is a square region having a side of 3.0 cm. The used filling factor distribution data is one in which the filling factor in the central portion is 60%, the filling factor in the outer portion is 0%, and a mean gradient is 40%/cm. When processing of generating a scatter dot pattern for an LED light in which 110,000 dots in total are arranged was performed using the dot-pattern generating apparatus according to the implementation of the present invention, it converged on an equilibrium state in 108 seconds from the start of the computation.

2.2. Experimental Example 2 (Implementation)

When the container R is a rectangular region of 30×157 mm and processing of generating a scatter dot pattern for a direct-lit type LCD backlight in which 280,000 dots are arranged was performed using the dot-pattern generating apparatus according to the implementation of the present invention, it converged on an equilibrium state in 279 seconds from the start of the computation.

2.3. Experimental Example 3 (Implementation)

When the container R is a rectangular region of 330×30 mm and processing of generating a scatter dot pattern for reducing a dark shadow patch at the bottom left/right hand corner of an edge-lit type LCD backlight in which 110,000 dots are arranged, the scatter dot pattern being applied to a dark shadow patch at the bottom left/right hand corner of a LCD, was performed using the dot-pattern generating apparatus according to the implementation of the present invention, it converged on an equilibrium state in 111 seconds from the start of the computation.

2.4. Experimental Examples 4 to 6 (Comparisons)

In Experimental Example 4, when processing of generating a scatter dot pattern for an LED light in which 110,000 dots are arranged was performed using the dot-pattern generating apparatus according to the comparison under the same condition as in Experimental Example 1, 38 minutes were needed for convergence on an equilibrium state.

In Experimental Example 5, when processing of generating a scatter dot pattern for a direct-lit type LCD backlight in which 280,000 dots are arranged was performed using the dot-pattern generating apparatus according to the comparison under the same condition as in Experimental Example 2, 38 minutes were needed for convergence on an equilibrium state.

In Experimental Example 6, when processing of generating a scatter dot pattern for reducing a dark shadow patch at the bottom left/right hand corner of an edge-lit type LCD backlight in which 110,000 dots are arranged was performed using the dot-pattern generating apparatus according to the comparison under the same condition as in Experimental Example 3, 15 minutes were needed for convergence on an equilibrium state.

3.1. Result of Generation of Dot Pattern in Experimental Example 1 (Implementation)

FIG. 8 illustrates example scatter dot patterns for an LED light according to Experimental Example 1. FIG. 8(A) illustrates a dot pattern in an initial dot arrangement generated using a low discrepancy sequence. FIG. 8(B) illustrates a set of circles placed for the respective dots in the initial dot arrangement. FIG. 8(C) illustrates a set of circles in an equilibrium state. FIG. 8(D) illustrates an output dot pattern based on position coordinate data. FIG. 8(A) reveals that the dots are arranged such that the dot density increases from the outer portion toward the central portion. FIG. 8(B) reveals that the circles having the radiuses corresponding to the dot densities illustrated in FIG. 8(A) are arranged. With reference to FIG. 8(B), in the initial dot arrangement formed by the LDS, imbalances of dots look like a pattern, and non-uniform distribution is clearly observed. In contrast, the arrangement of circles in the equilibrium state illustrated in FIG. 8(C) achieves a significantly higher uniformity, in comparison to the arrangement of circles illustrated in FIG. 8(B). The final dot pattern illustrated in FIG. 8(D) achieves a significantly uniform dot distribution, in comparison with the initial dot arrangement illustrated in FIG. 8(A).

3.2. Result of Generation of Dot Pattern in Experimental Example 2 (Implementation)

Figure 9:
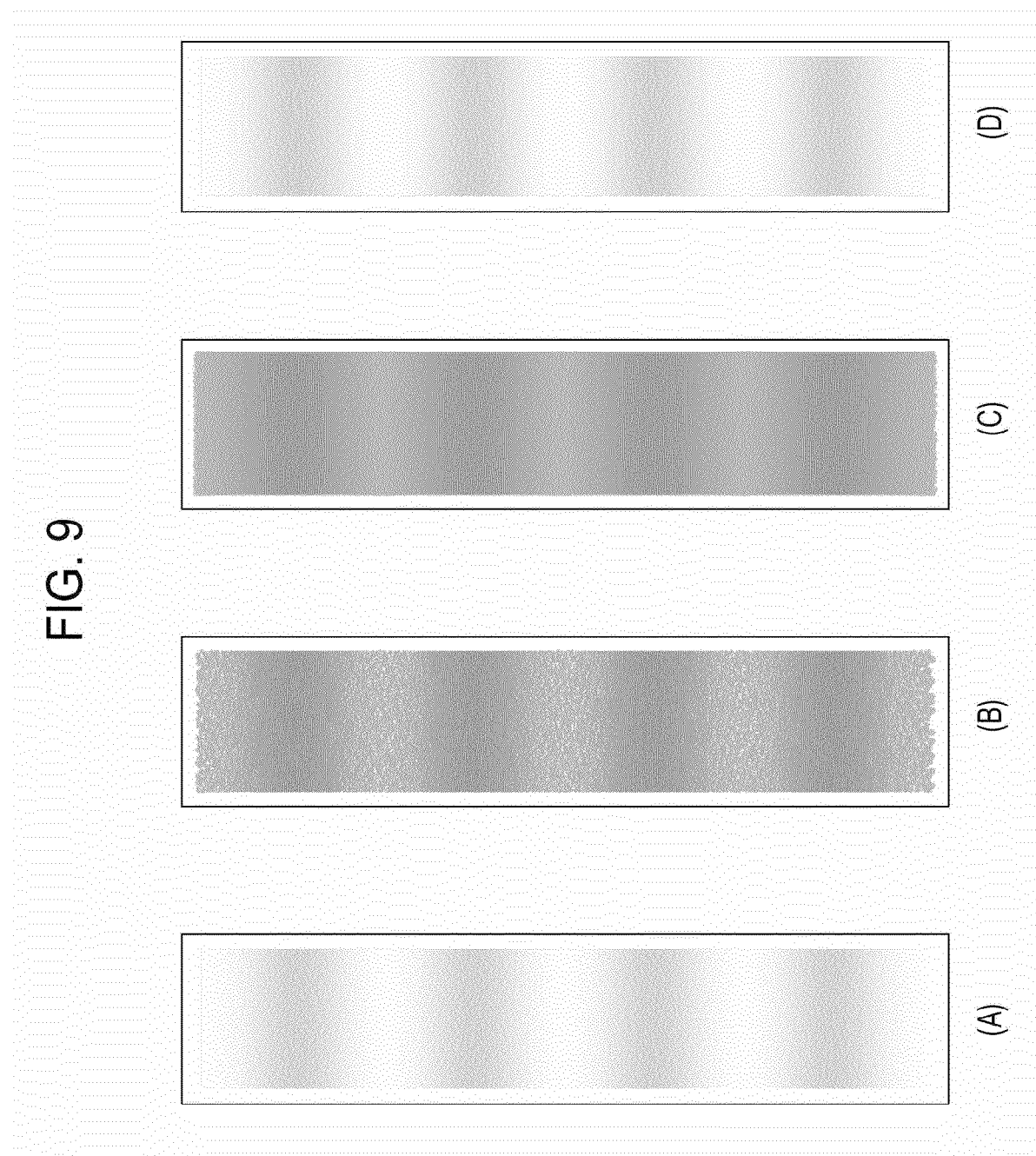
FIG. 9 illustrates example scatter dot patterns for a direct-lit type LCD backlight.

FIG. 9 illustrates example scatter dot patterns for a direct-lit type LCD backlight according to Experimental Example 2. FIG. 9(A) illustrates a dot pattern in an initial dot arrangement. FIG. 9(B) illustrates a set of circles in the initial dot arrangement. FIG. 9(C) illustrates a set of circles in an equilibrium state. FIG. 9(D) illustrates an output dot pattern based on position coordinate data. FIG. 9(A) reveals that the dots are arranged such that the dot density periodically varies with respect to a light source pattern. With reference to FIGS. 9(A) and 9(B), in the initial dot arrangement formed by the LDS, imbalances of dots look like a pattern, and non-uniform distribution is clearly observed. In contrast, the arrangement of circles and the dot pattern in the equilibrium state illustrated in FIGS. 9(C) and 9(D) achieve a significantly higher uniformity, in comparison to those illustrated in FIGS. 9(A) and 9(B).

3.3. Result of Generation of Dot Pattern in Experimental Example 3 (Implementation)

Figure 10:
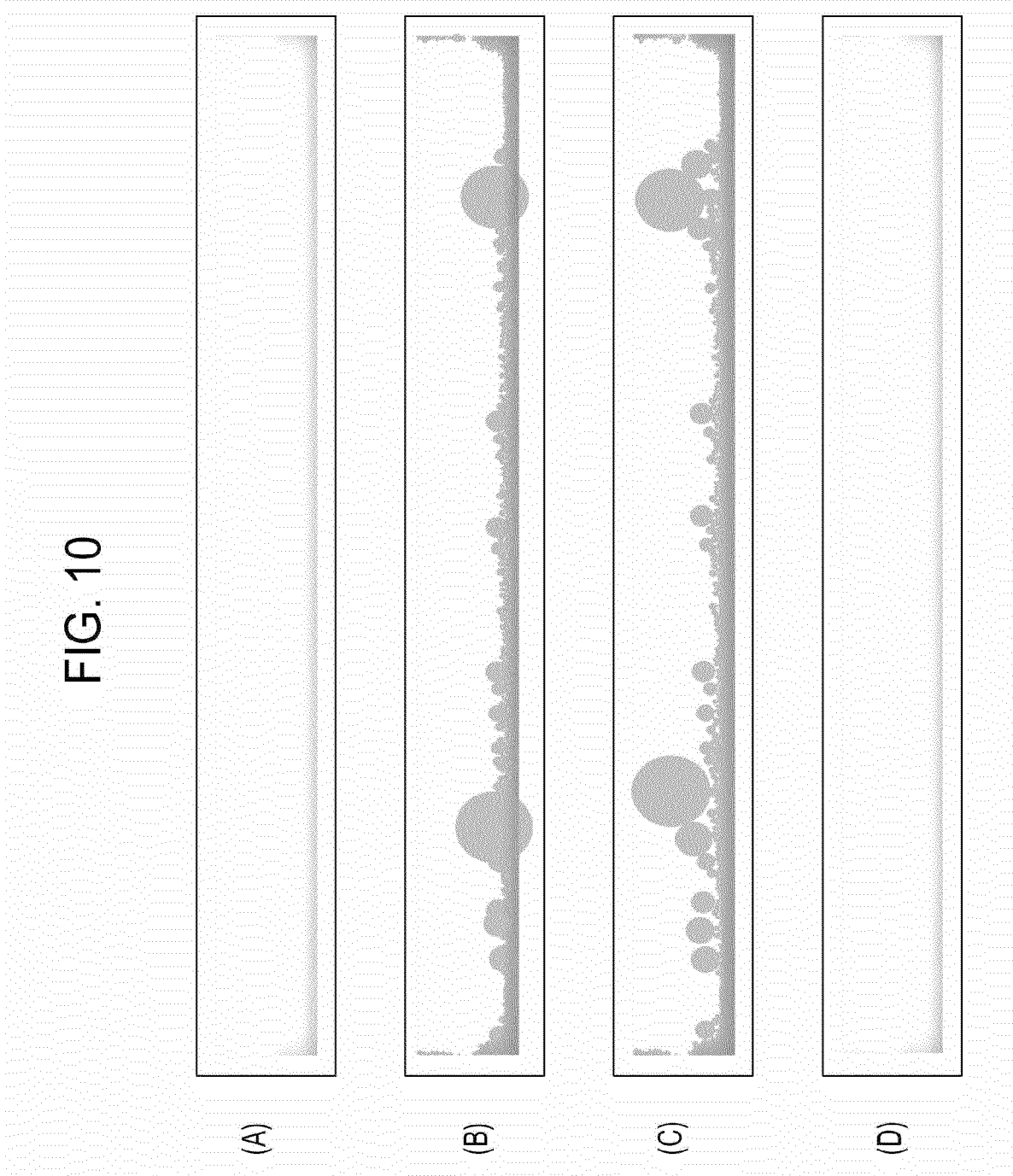
FIG. 10 illustrates example scatter dot patterns for reducing a dark shadow patch at the bottom left/right hand corner of an edge-lit type LCD backlight.

FIG. 10 illustrates example scatter dot patterns for reducing a dark shadow patch at the bottom left/right hand corner of an edge-lit type LCD backlight according to Experimental Example 3. FIG. 10(A) illustrates a dot pattern in an initial dot arrangement. FIG. 10(B) illustrates a set of circles in the initial dot arrangement. FIG. 10(C) illustrates a set of circles in an equilibrium state. FIG. 10(D) illustrates an output dot pattern based on position coordinate data. FIGS. 11(A) to 11(D) are enlarged views of the lower left corners in the scatter dot patterns for reducing a dark shadow patch at the bottom left/right hand corner of the edge-lit type LCD backlight illustrated in FIGS. 10(A) to 10(D). The arrangements of circles illustrated in FIGS. 10(C) and 11(C) and the dot patterns in the equilibrium state in FIGS. 10(D) and 11(D) achieve a significantly higher uniformity, in comparison to those illustrated in FIGS. 10(A) and 11(A) and those illustrated in FIGS. 10(B) and 11(B).

3.4. Result of Generation of Dot Pattern in Experimental Example 6 (Example)

FIG. 12(B) is an enlarged view of the lower left corner in the scatter dot patterns for reducing a dark shadow patch at the bottom left/right hand corner of the edge-lit type LCD backlight obtained in Experimental Example 6. FIG. 12(A) is an enlarged view of the lower left corner in the scatter dot patterns for reducing a dark shadow patch at the bottom left/right hand corner of the edge-lit type LCD backlight obtained in Experimental Example 3 for comparison. The comparison between FIGS. 12(A) and 12(B) reveals that dots E escaping to a blank region, which are not observed in FIG. 12(A), occurs in the dot pattern obtained in Experimental Example 6 illustrated in FIG. 12(B) and thus that explicit deterioration in quality is observed in the dot pattern obtained Experimental Example 6.

4. COMPARISON OF CALCULATION TIMES BETWEEN EXPERIMENTAL EXAMPLES 1 TO 3 (IMPLEMENTATIONS) AND EXPERIMENTAL EXAMPLES 4 TO 6 (COMPARISONS)

Figure 13:
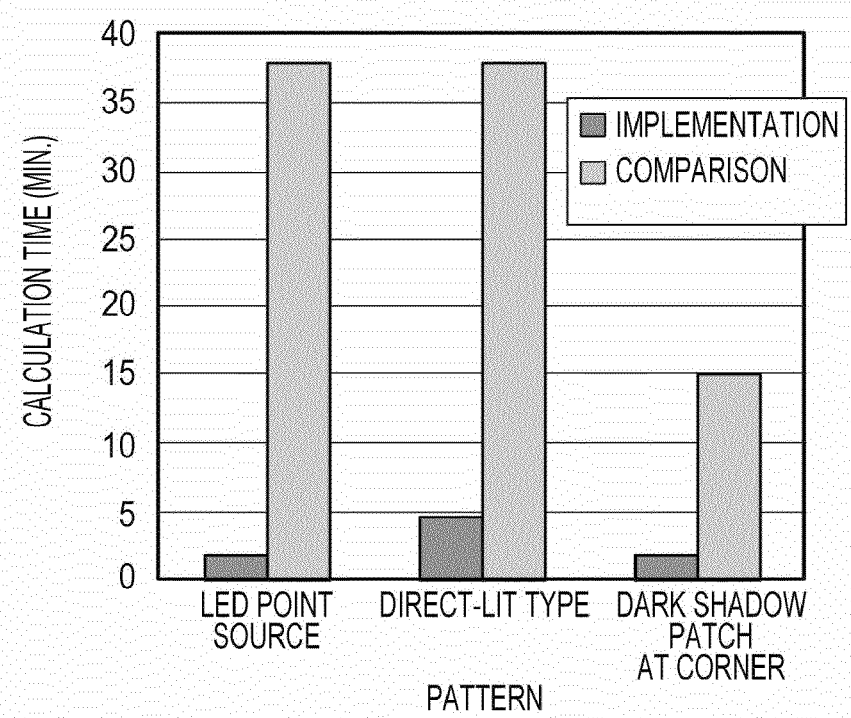
FIG. 13 is a bar graph that represents calculation times required for dot-pattern generating processing according to each experimental example.

FIG. 13 is a bar graph that represents calculation times required for dot-pattern generating processing according to Experimental Examples 1 to 3 and Experimental Examples 4 to 6. As illustrated in FIG. 13, with the dot-pattern generating processing according to the present implementation, generation of a dot pattern having an equal or higher quality can be completed approximately 8 to 20 times faster, in comparison to the comparisons.

5. EVALUATION OF EXCESS PROXIMITY IN DOT PATTERN

Tables 1 and 2 show results of counts of excess dots in dot patterns generated in Experimental Examples 1 to 3 (Implementations) and Experimental Examples 4 to 6 (comparisons). Table 1 shows results of counts of the number of pairs of dots whose center-to-center distance is 46 µm or less with respect to a dot size of 46 µm, that is, pairs of dots which clearly collide with each other. Table 2 shows the results of the counts of the number of pairs of dots whose center-to-center distance is 60 µm or less with respect to a dot size of 46 µm, that is, pairs of excess proximate dots that have a high probability of appearing as being luminance non-uniformity.

TABLE 1

| Patten | Total Number of Dots | Total Number of Pairs | Before Relaxation | Implementation | Comparison |
|---|---|---|---|---|---|
| LED Point Source | 117,088 | 6,854,741,328 | 57,949 | 0 | 1,315 |
| Direct-lit Type | 287,080 | 41,207,319,660 | 36,827 | 0 | 0 |
| Dark Shadow Patch at Corner | 111,211 | 6,183,887,655 | 24,339 | 0 | 1 |

TABLE 2

| Patten | Total Number of Dots | Total Number of Pairs | Before Relaxation | Implementation | Comparison |
|---|---|---|---|---|---|
| LED Point Source | 117,088 | 6,854,741,328 | 104,530 | 32,644 | 37,844 |
| Direct-lit Type | 287,080 | 41,207,319,660 | 73,055 | 0 | 2 |
| Dark Shadow Patch at Corner | 111,211 | 6,183,887,655 | 45,523 | 16 | 66 |

In the above Tables 1 and 2, for the pattern in "LED Point Source," the implementation corresponds to the Experimental Example 1 and the comparison corresponds to Experimental Example 4; for the pattern in "Direct-lit Type," the implementation corresponds to the Experimental Example 2 and the comparison corresponds to Experimental Example 5; for the pattern in "Dark Shadow Patch at Corner," the implementation corresponds to the Experimental Example 3 and the comparison corresponds to Experimental Example 6. "Before Relaxation" in Table 1 indicates the number of pairs in which explicit collisions occur in the initial dot arrangement, and "Before Relaxation" in Table 2 indicates the number of excess proximate pairs in the initial dot arrangement.

As shown in Tables 1 and 2, with the dot-pattern generating apparatus according to the implementations of the present invention, it is revealed that, in the generated dot pattern, no pairs of dots colliding with each other occur and the number of excess proximate dots is smaller than that in the comparisons.

6. CONCLUSION

The above Experimental Examples show that the dot-pattern generating apparatus according to the implementations of the present invention can make a dot pattern converge on an equilibrium state with significantly higher speed, in comparison to a method of obtaining a dot pattern by defining an interaction force between dots and solving a multi-body problem in the comparisons, and also can achieve an equal or higher dot pattern quality. In addition, it is shown that a phenomenon in which a part of dots escapes to a blank region can be avoided in the dot pattern in the implementations of the present invention. If a dot escapes to a blank region, manual adjustment is needed. Therefore, with the dot-pattern generating processing according to the implementations of the present invention, the cost of a task required for dot adjustment can be reduced.

Although the present invention is described above using an embodiment and implementation illustrated in the drawings, the present invention is not limited to the embodiment illustrated in the drawings. Changes, such as other embodiments, addition, modification, and deletion may be made within a range conceivable by those skilled in the art. In any mode, as long as operations and advantages of the present invention are achieved, any changes are included in the scope of the present invention.

What is claimed is:

1. A computer-implemented method for generating a spatial arrangement of a plurality of elements of a discrete pattern for use in a display device, the plurality of elements being arranged in a spatially discrete manner, the method being executable by a processor device of a computer system, the method comprising:

determining, by said processor device, for each of said elements, a density in an initial position given to the element from a density distribution of the elements in a region where said elements are arranged in said discrete pattern and placing, for each of said elements, a figure and a movement range of said figure, said figure having a size corresponding to said density and representing a region where said element repels other elements;

solving, by said processor device, an optimization problem so as to minimize an objective function for imposing a penalty on each of a collision between said figures and a protrusion of said figure from said movement range using a position of each of said figures as a decision variable and computing an optimal solution of the position of each of the said figures; and outputting, by said processor device, the optimal solutions of the positions of said figures as said spatial arrangement of the elements to a display device, wherein each of said elements is a dot, said discrete pattern is a dot pattern including the plurality of dots being two-dimensionally discrete, each of said figures is a circle, and a radius $r_i$ of the circle i is determined according to an inequality:

$$r_i = r_0 \sqrt{\frac{a}{\rho}} > r_0 \sqrt{\frac{\pi}{2\sqrt{3}\rho}}$$

where $r_0$ denotes a radius of said dot being said element, $\rho$ denotes a filling factor of said dots in the initial positions, and a is a constant that satisfies the inequality, and wherein said display device includes a backlight unit having a light guide plate that generates a luminance distribution for said display responsive to a scatter pattern, said output solution including position coordinate data representing positional coordinates of each dot in said discrete dot pattern applied to generate the scatter pattern in the light guide plate to reduce a luminance non-uniformity for said display.

2. The computer-implemented method according to claim 1, wherein said objective function includes a non-linear term for imposing said penalty in accordance with a depth of said collision between said figures and a non-linear term for imposing said penalty in accordance with a depth of said protrusion of said figure from said movement range.

3. The computer-implemented method according to claim 2, wherein said objective function further includes a non-linear term for imposing a penalty on a protrusion of said figure from a container that defines said region where said elements are arranged in accordance with a depth of said protrusion.

4. The computer-implemented method according to claim 1, further comprising:
  generating, by said processor device, an initial arrangement of said elements using a low discrepancy sequence, said initial arrangement reproducing said density distribution of said elements, and
  writing, using said processor device, said initial position of each of said elements in a storage unit.

5. The computer-implemented method according to claim 2, wherein said computing step further comprises:
  dividing, by said processor device, said container defining said region in which said elements are to be arranged into a plurality of zones and detecting said collision between said figures belonging to each of the said zones, and
  omitting at least a calculation of said penalty on said figures that are impossible to collide with each other because said figures do not belong to the same zone.

6. A computer program product for achieving an information processing apparatus for calculating a spatial arrangement of a plurality of elements of a discrete pattern, the plurality of elements being arranged in a spatially discrete manner, the computer program product comprising:
  a computer readable storage medium having computer readable non-transient program code embodied therein, the computer readable program code comprising:
  computer readable program code configured to perform the steps of:
  determining, for each of said elements, a density in an initial position given to said element from a density distribution of said elements in a region where said elements are arranged in said discrete pattern and configured to place, for each of said elements, a figure and a movement range of said figure, said figure having a size corresponding to said density and representing a region where said element repels other elements;
  minimizing an objective function for imposing a penalty on each of a collision between said figures and a protrusion of said figure from said movement range using a position of each of said figures as a decision variable and configured to compute an optimal solution of said position of each of said figures; and
  outputting the optimal solutions of said positions of said figures as said spatial arrangement of said elements to a display device,
  wherein each of said elements is a dot, said discrete pattern is a dot pattern including the plurality of dots being two-dimensionally discrete, each of said figures is a circle, and a radius $r_i$ of the circle i is determined according to an inequality:

$$r_i = r_0 \sqrt{\frac{a}{\rho}} > r_0 \sqrt{\frac{\pi}{2\sqrt{3}\rho}}$$

where $r_0$ denotes a radius of said dot being said element, p denotes a filling factor of said dots in the initial positions, and a is a constant that satisfies the inequality, and wherein said display device includes a backlight unit having a light guide plate that generates a luminance distribution for said display responsive to a scatter pattern, said output solution including position coordinate data representing positional coordinates of each dot in said discrete dot pattern applied to generate the scatter pattern in the light guide plate to reduce a luminance non-uniformity for said display.

7. The computer program product according to claim 6, wherein said objective function includes a non-linear term for imposing said penalty in accordance with a depth of said collision between said figures and a non-linear term for imposing said penalty in accordance with a depth of said protrusion of said figure from said movement range.

8. The computer program product according to claim 7, wherein said objective function further includes a non-linear term for imposing a penalty on a protrusion of said figure from a container that defines said region where said elements are arranged in accordance with a depth of said protrusion.

9. The computer program product according to claim 6, further comprising:
  generating an initial arrangement of said elements using a low discrepancy sequence, said initial arrangement reproducing said density distribution of said elements, and
  writing said initial position of each of said elements in a storage unit.

10. The computer program product according to claim 7, wherein said computing step further comprises:
  dividing, by said processor device, said container defining said region in which said elements are to be arranged into a plurality of zones and detecting said collision between said figures belonging to each of the said zones, and
  omitting at least a calculation of said penalty on said figures that are impossible to collide with each other because said figures do not belong to the same zone.

11. The computer program product according to claim 6, wherein the method further comprises: calculating the size of said figure placed for each of said elements using an element size provided as an input and a filling factor of said elements in the respective initial positions provided from said density distribution of said elements.

12. The computer program product according to claim 6, wherein said generated dot pattern satisfies a condition that it is irregular to a degree at which no moiré fringes occur between the dot pattern and a member of said display device containing a regular pattern, and is sufficiently uniform such that the luminance non-uniformity is not visually recognized.

13. The computer program product according to claim 6, wherein said movement range defines a movable range for each dot such that the dot is prevented to move away from an initial arrangement, and has a size corresponding to the dot filling factor $\rho$ in the initial position of the dot, and is represented by said figure such that a center of said figure is the initial position of the dot.

14. The computer implemented method according to claim 1, further comprising: calculating the size of said figure placed for each of said elements using an element size provided as an input and a filling factor of said elements in the respective initial positions provided from said density distribution of said elements.

15. The computer implemented method according to claim 1, wherein said generated dot pattern satisfies a condition that it is irregular to a degree at which no moiré fringes occur between the dot pattern and a member of said display device containing a regular pattern, and is sufficiently uniform such that the luminance non-uniformity is not visually recognized.

16. The computer implemented method according to claim 1, wherein said movement range defines a movable range for each dot such that the dot is prevented to move away from an initial arrangement, and has a size corresponding to the dot filling factor $\rho$ in the initial position of the dot, and is represented by said figure such that a center of said figure is the initial position of the dot.

* * * * *